(12) United States Patent
Masuda

(10) Patent No.: US 6,851,871 B2
(45) Date of Patent: Feb. 8, 2005

(54) LENS APPARATUS AND CAMERA

(75) Inventor: Shinichi Masuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/632,941

(22) Filed: Aug. 1, 2003

(65) Prior Publication Data
US 2004/0027476 A1 Feb. 12, 2004

(30) Foreign Application Priority Data
Aug. 6, 2002 (JP) ......................... 2002-228964

(51) Int. Cl.7 .................. G03B 17/00; G03B 11/04
(52) U.S. Cl. ......................... 396/448; 359/511
(58) Field of Search .......................... 396/448, 439, 396/348, 349, 535, 85, 75, 84, 87, 79, 62, 133, 148, 379, 377, 462, 542; 359/696–701, 705, 704, 511, 694, 600

(56) References Cited

U.S. PATENT DOCUMENTS 5,602,607 A * 2/1997 Kato et al. .................. 396/349
6,164,842 A * 12/2000 Ohta et al. .................. 396/349
6,264,380 B1 * 7/2001 Omiya ........................ 396/448
6,312,168 B1 * 11/2001 Naruse et al. ............... 396/349
2002/0136554 A1 * 9/2002 Nomura et al. .............. 396/448

FOREIGN PATENT DOCUMENTS

JP  H10-68984  3/1998
JP  2002-14271  1/2002

* cited by examiner

Primary Examiner—Judy Nguyen
Assistant Examiner—Rochelle Blackman
(74) Attorney, Agent, or Firm—Cowan, Liebowitz & Latman, P.C.

(57) ABSTRACT

This invention discloses a lens apparatus that can surely drive a barrier member by rotating a driving member. A lens apparatus according to this invention comprises a lens forming an optical image, a barrier member which can be moved open and close, a driving member that drives the barrier member to an open position by rotating in one direction around an optical axis, and drives the barrier member to a close position by rotating in another direction around the optical axis, an energizing member energizing the driving member in one direction, and a barrel which is constructed around the optical axis. The barrel has a first guide portion rotating the driving member in the one direction, and a second guide portion rotating the driving member in the other direction according to a relative position change with the driving member with resisting an energizing force of the energizing member.

12 Claims, 28 Drawing Sheets

PRIOR ART

LENS APPARATUS AND CAMERA

BACKGROUND OF THE INVENTION

1. Field of the Invention

The present invention relates to a lens apparatus and a camera, and in particular, to a barrier mechanism provided in front of a lens unit so as to protect an image pickup optical system, and a lens driving mechanism that drives a lens unit in the image pickup optical system. In addition, the present invention is suitable for optical equipment such as cameras for 35-mm and 24-mm films, digital still cameras, and video cameras.

2. Description of Related Art

As a conventional barrier apparatus of a lens shutter camera, an apparatus is proposed in Japanese Patent Application Laid-Open No. H10(1998)-68984. In FIG. 27 (FIG. 1 in this official gazette), a barrier driving ring 506 driving the opening and closing of barrier blades 502 and 503 by rotary operation is energized by a spring 507 in the driving direction where the barrier blades open. Then, when the camera is in an image-taking state, the barrier blades are made to be open by rotating the barrier driving ring 506 by an energizing force of the spring 507.

In addition, when the camera is in a barrel-collapsed state, as shown in FIG. 28 (FIG. 9 in this official gazette), the barrier blades are made to be closed by rotating the barrier driving ring 506 in a predetermined direction since a cam face 510a of a base plate 510 pushes a follower arm 506i on the barrier driving ring 506 with resisting the energizing force of the spring 507.

On the other hand, in a transfer apparatus that moves a plurality of lens units, which constitutes the image pickup optical system, in the direction of an optical axis, it is common to move each lens unit in the direction of the optical axis by driving cams.

In addition, a mechanism of moving one lens unit in the direction of the optical axis across a plurality of cam grooves is proposed in Japanese Patent Application Laid-Open No. 2002-14271.

In FIG. 29, a lens unit 652 moves in the direction of the optical axis from a middle position to a telephoto position by an engaging action between a cam pin 619d on a lens holding member 619 and a cam groove 602k formed in a cam plate 602. In addition, the cam pin 619d disengages from the cam groove 602k in the middle position to a wide-angle position, and moves in the direction of the optical axis with the cam pin 646a according to the engaging action between a cam pin 646a on another driving member 646 and a cam groove 640g on a second differential barrel 640.

Nevertheless, in the barrier apparatus disclosed in the above-described Japanese Patent Application Laid-Open No. H10(1998)-68984, the barrier driving ring 506 malfunctions when a spring force of the spring 507 is insufficient because of breakage of the spring 507 caused by a shock from the outside, or the adhesion of sand or dust. Hence, the barrier blades 502 and 503 may remain in a closing state even if the camera is in an image-taking state.

Here, there is a problem that exposure to a film or an image pickup device such as a CCD is insufficient since it is possible to take a picture even when the barrier blades 502 and 503 are not completely open when the camera is in the image-taking state. In order to solve such a problem, a camera is proposed, the camera that is provided with a detection switch, which detects whether the barrier blades are open or close, in a camera body, and that verifies an open/close state of barrier blades on the basis of the detection result of this detection switch. Nevertheless, cost rises in this case to the extent that the detection switch is installed.

On the other hand, in a lens barrel disclosed in Japanese Patent Application Laid-Open No. 2002-14271, two cam grooves (602k and 640g in FIG. 29) are used so as to move one lens unit, and are switched in between middle and telephoto positions. In this structure, another member (646) that guides the lens unit from a lens-barrel collapse position to a wide-angle position is used so as to accurately put the cam pin (619d) in the cam groove (602k) whose edge is cut. Hence, the number of parts increases.

SUMMARY OF THE INVENTION

A lens apparatus according to the present invention comprises: a lens unit forming an optical image; a barrier member which can be moved open and close; a driving member that drives the barrier member into an opening position by rotating in one direction around an optical axis, and drives the barrier member into a close position by rotating in another direction around the optical axis; an energizing member energizing the driving member in the one direction; and a barrel which is constructed around the optical axis. Then, the driving member and the barrel move in the direction of the optical axis relatively. The body member has a first guide portion rotating the driving member in the one direction, and a second guide portion that rotates the driving member in another direction while resisting an energizing force of the energizing member according to a relative position change with the driving member. The driving member drives the barrier member into the open position by rotating in the one direction by the first guide portion when the driving member can not rotate into a position corresponding to the open position of the barrel member by the energizing force of the energizing member.

Here, the barrel has a third guide portion that guides the driving member to the second guide portion according to the relative position change of the driving member.

A lens apparatus according to the present invention comprises: a lens unit forming an optical image; a barrier member which can be moved open and close; a driving member that drives the barrier member to an open position by rotating in one direction around an optical axis, and drives the barrier member to a close position by rotating in another direction around the optical axis; a resistive member impeding the rotation of the driving member; and a barrel which is constructed around the optical axis. Then, the driving member and the barrel move in the direction of the optical axis relatively. The barrel has a first guide portion rotating the driving member in the one direction, and a second guide portion that rotates the driving member in another direction according to a relative position change with the driving member.

Here, the barrel has a third guide portion that guides the driving member to the second guide portion according to the relative position change with the driving member.

The features of the lens apparatus and camera according to the present invention will become clear by the description of the following specific embodiments with referring to drawings.

DETAILED DESCRIPTION OF THE PREFERRED EMBODIMENTS (Embodiment 1)

A lens barrel and a camera that are Embodiment 1 of the present invention will be described by using FIGS. 1 to 22.

Figure 2:
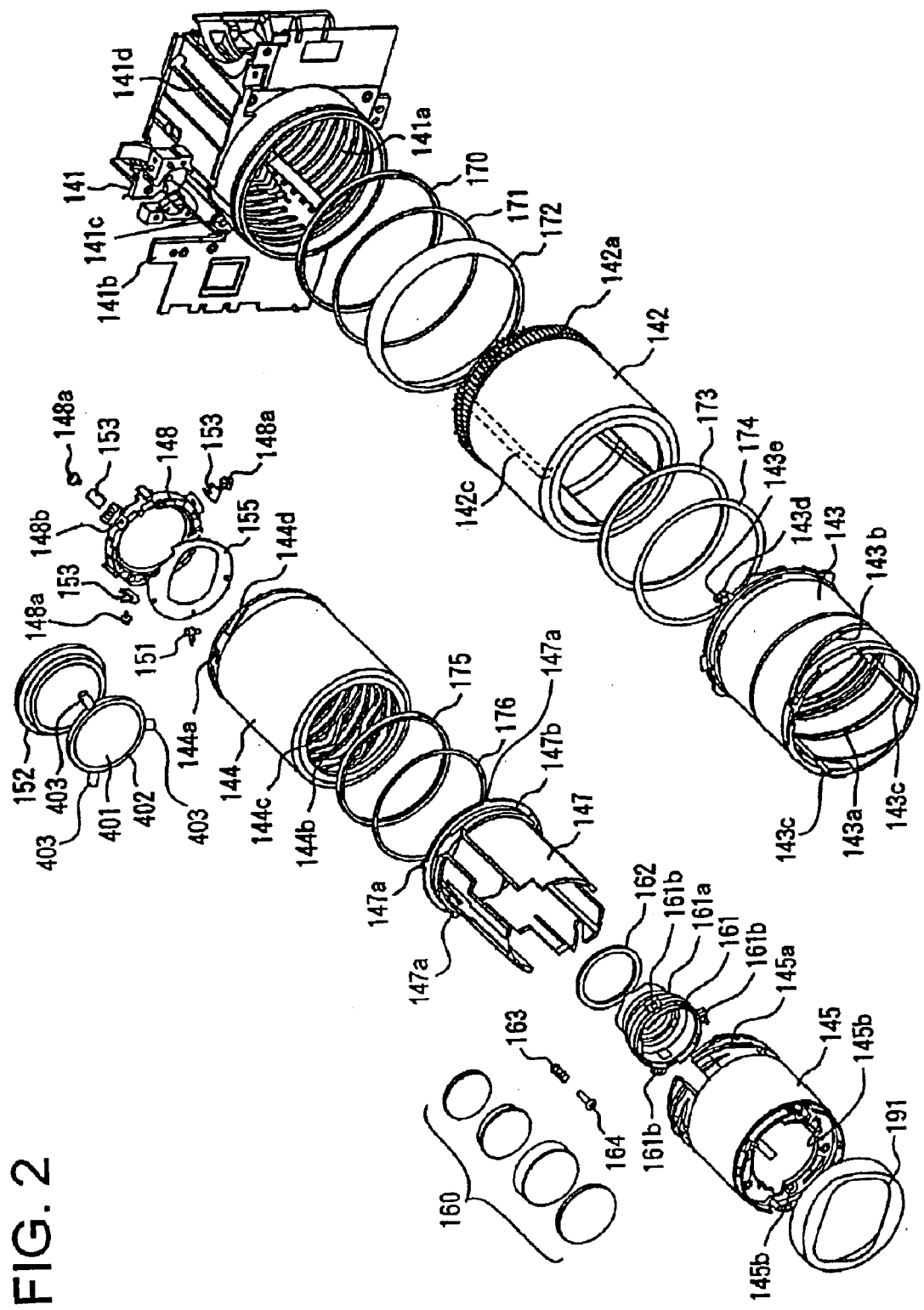
FIG. 2 is an exploded perspective view of a lens barrel.
Figure 3:
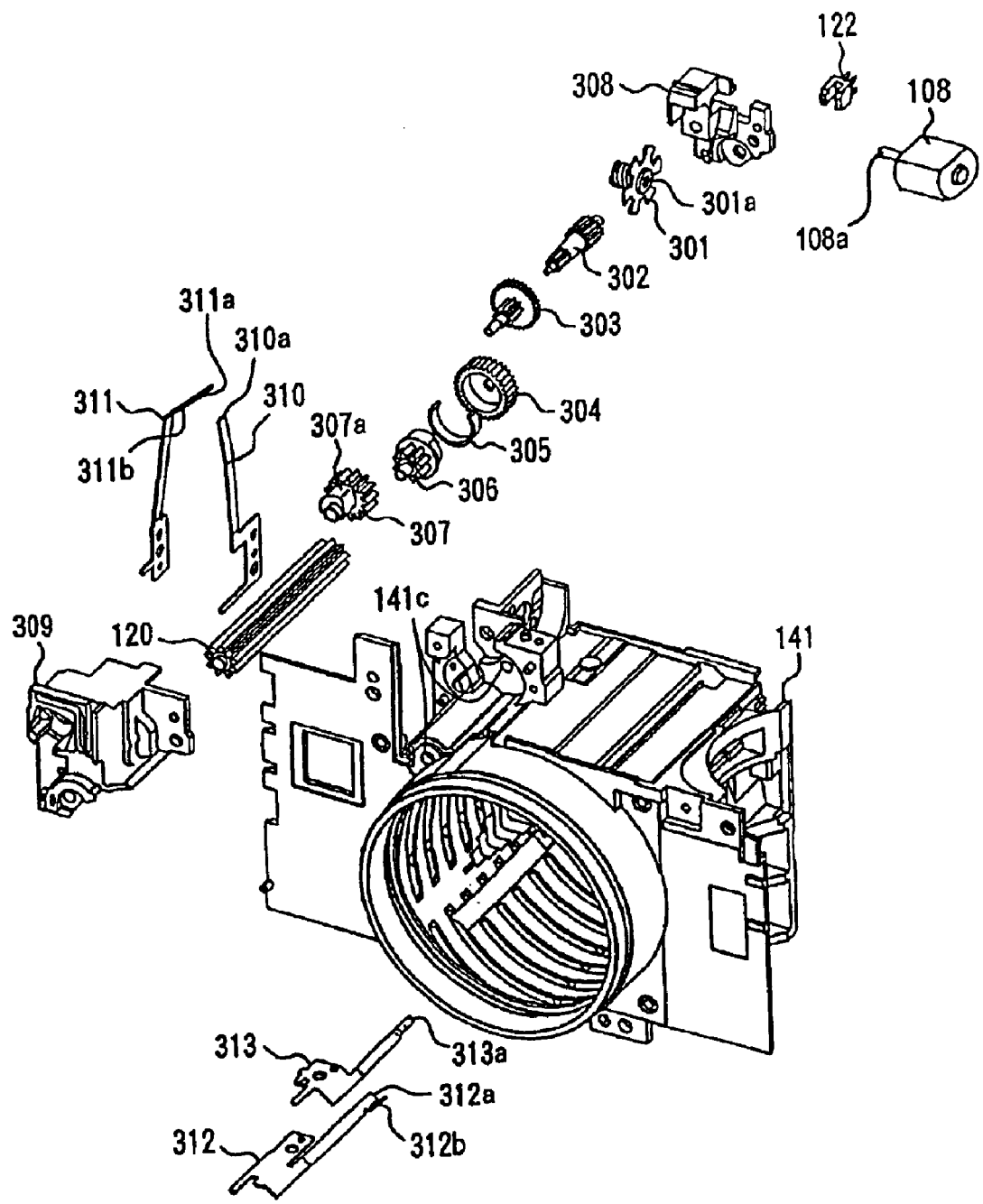
FIG. 3 is an exploded perspective view of a zoom driving system of the lens barrel.

Referring to FIGS. 2 and 3, the following is an explanation of the structure of the lens barrel according to this embodiment. The lens barrel according to this embodiment is a 3-stage collapsible (telescoping type) lens barrel including two so-called "differential barrels."

Figure 4:
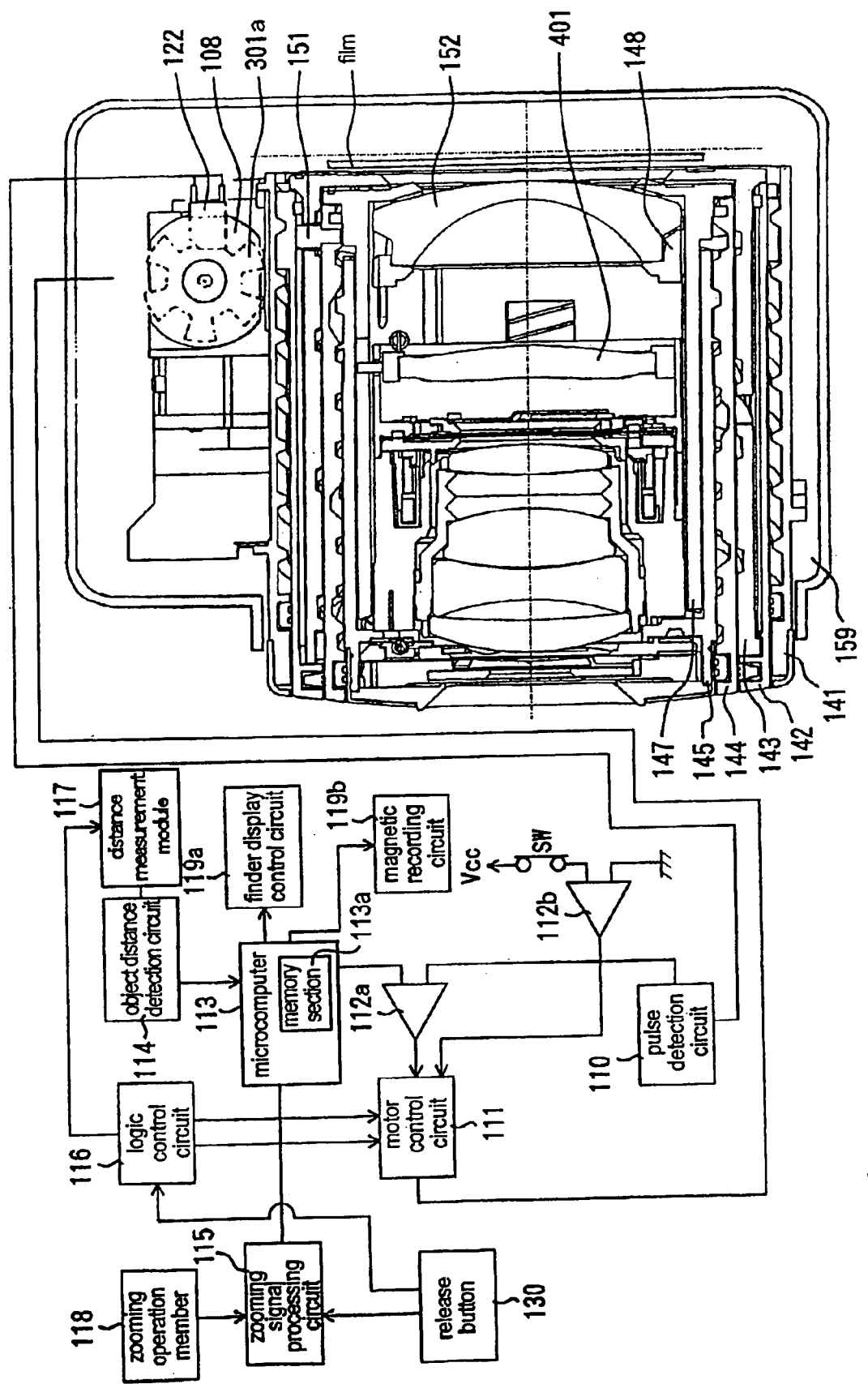
FIG. 4 includes a sectional view of a lens barrel in a lens-barrel collapse state and a schematic diagram of a drive control system of the lens barrel.
Figure 7:
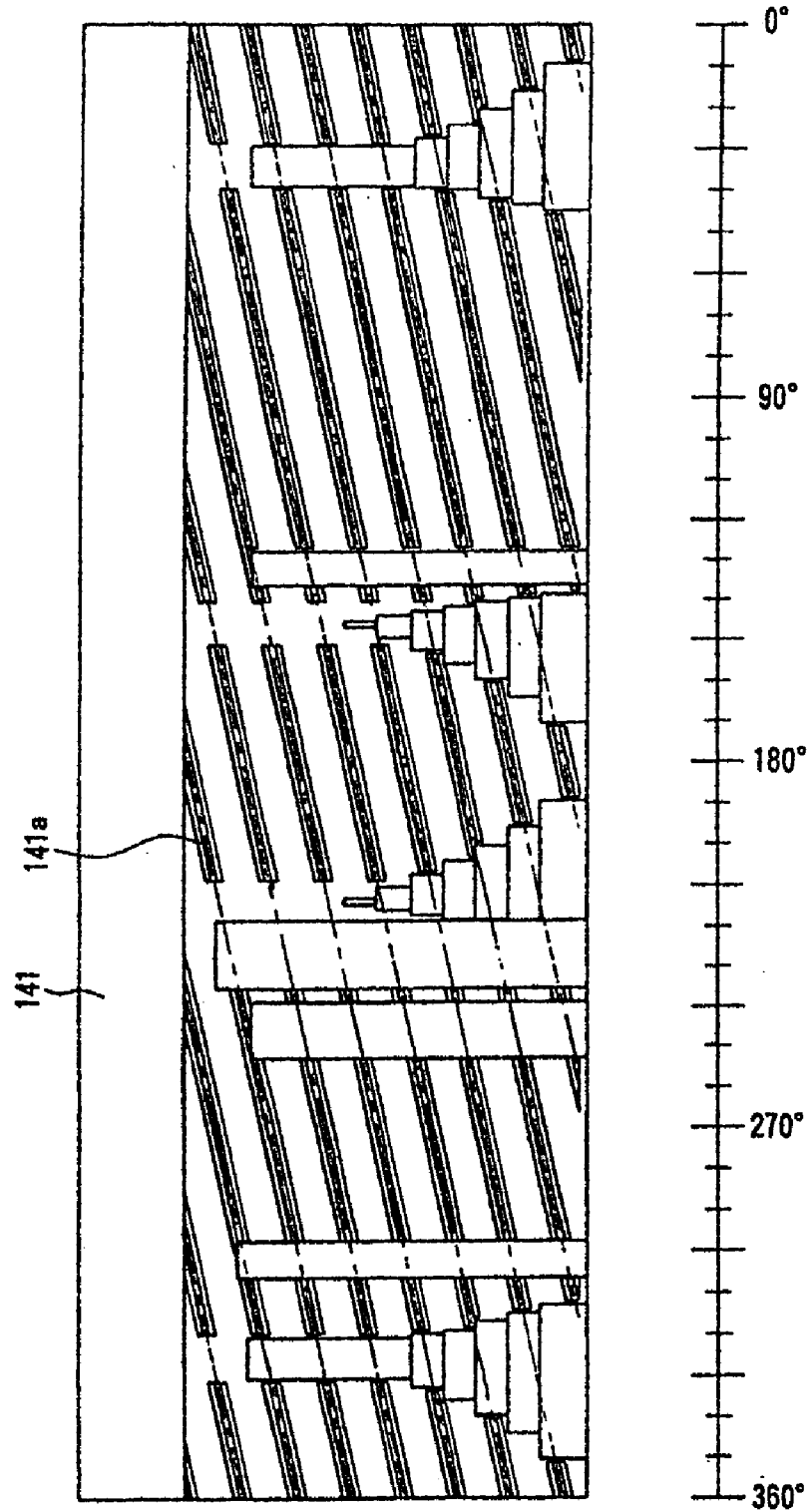
FIG. 7 is a developed view of a fixed barrel.

Numeral reference 141 denotes a fixed barrel, which is fixed via a flange portion 141b to a camera body 159 (FIG. 4). Female helicoids 141a are formed in an inner circumferential surface of this fixed barrel 141 as shown in FIG. 7. A fixed light-blocking rubber 170, a fixed light-blocking sheet 171 and a fixed cover 172 are arranged in front of the fixed barrel 141.

Numeral reference 142 denotes a first differential barrel. A male helocoid, which engages the female helicoids 141a, and a gear meshing with a long face pinion 120 are formed overlappingly on the outer circumference 142a at the rear end of the first differential barrel 142. The first differential barrel 142 can be advanced and retracted in the direction of the optical axis while being rotated around the optical axis by the engaging action of the female helicoids 141a and the male helicoids. A first light-blocking rubber 173 and a first light-blocking sheet 174 are arranged in front of the first differential barrel 142.

Numeral reference 143 denotes a first rectilinear motion barrel that is arranged inward from the first differential barrel 142, and that can slide with respect to a rotation around the optical axis of the first differential barrel 142. A pin portion 143e formed on a saddle portion 143d of the first rectilinear motion barrel 143 engages a rectilinear motion groove 141d of the fixed barrel 141.

A zoom gear unit that rotates the first differential barrel 142 is fixed to and supported by the fixed barrel 141, as shown in FIG. 3. Of the gears of the zoom gear unit, the long face pinion 120 is supported rotatively by the fixed barrel 141 by fitting its two end portions through holes 141c in the fixed barrel 141.

A first gear 301 is press-fitted to a rotation shaft 108a of a motor 108, and this first gear 301 meshes with a second gear 302. The second gear 302 meshes with a third gear 303, which in turn meshes with a fourth gear 304.

A slipper spring 305 is arranged between the fourth gear 304 and a fifth gear 306, and the fourth gear 304 and the fifth gear 306 can be rotated unitarily through the friction force due to deformation of the slipper spring 205. Here, when a torque is applied to the fourth gear 304 or the fifth gear 306 that exceeds the friction force of the slipper spring 305, then the fourth gear 304 and the fifth gear 306 slip against one another, and the transmission of an excessive force to the motor 108 can be prevented.

The fifth gear 306 meshes with a sixth gear 307, and this sixth gear 307 meshes with the long face pinion 120.

A tip portion 310a of a first zoom-stage switch 310 is ordinarily in contact with an intermediate portion 311b of a second zoom-stage switch 311, so that their electrical connection is in an ON state. When the sixth gear 307 is rotated through the drive force of the motor 108, a solid cam portion 307a pushes a contact portion 311a of the second zoom-stage switch 311 upward, so that the contact between the front end portion 310a and the intermediate portion 311b is lost, and their electrical connection assumes an OFF state. This switching of the electrical connection from ON to OFF is performed for each focal length when zooming, thereby transmitting focal length information to the camera body when zooming.

A first zoom base 308 and a second zoom base 309 are arranged at the two ends of the gear train made up of the first gear 301 to the sixth gear 307, and the gear train is fixed to the fixed barrel 141 by screwing these zoom bases 308 and 309 to the fixed barrel 141.

A first collapsed-end switch 312 and a second collapsed-end switch 313 are fixed at the bottom of the fixed barrel 141, and when the lens barrel has been thrust out in the direction of the optical axis to the image-taking position, a tip portion 312a and a tip portion 313a come in contact, thus assuming an electrical ON state. On the other hand, when the lens barrel is pulled back in the direction of the optical axis from the image-taking state and assumes a non-image-taking state, then the rear end of the first rectilinear motion barrel 143 pushes down an edge 312b of the first collapsed-end switch 312, so that the tip portion 312a and the tip portion 313a are not in contact anymore, thus assuming an electrical OFF state.

The ON/OFF signals from the first collapsed-end switch 312 and the second collapsed-end switch 313 are output to the camera body, which decides whether the lens barrel is in an image-taking state or in a non-image-taking state.

When a drive force is transmitted from the motor 108 to the long face pinion 120, the first differential barrel 142, which is in a gear engagement with the long face pinion 120, rotates around the optical axis, in accordance with the rotation of the long face pinion 120.

Here, the first differential barrel 142 moves in the direction of the optical axis with rotating around the optical axis by helicoid's coupling with the female helicoid 141a of the fixed barrel 141.

Here, since the outer circumferential rear portion (male helicoids) 142a of the first differential barrel 142 is engaged with the female helicoids 141a of the fixed barrel 141, the first differential barrel 142 is advanced or retracted in the direction of the optical axis while rotating around the optical axis.

The pin portion 143e at the first rectilinear motion barrel 143 engages the rectilinear motion groove 141d of the fixed barrel 141, and the first rectilinear motion barrel 143 can slide with respect to a rotation of the first differential barrel 142, so that it is advanced/retracted only in the direction of the optical axis, and affected only by the advancing/retracting motion of the first differential barrel 142 in the direction of the optical axis.

Numeral reference 144 denotes a second differential barrel, which is incorporated inward from the first rectilinear motion barrel 143. A plurality of male helicoids 144d formed in an outer circumferential surface of the second differential barrel 144 engage a plurality of second cam grooves 143a formed in the first rectilinear motion barrel 143. A second light-blocking rubber 175 and a second light-blocking sheet 176 are arranged in front of the second differential barrel 144.

A drive pin 151, which is fixed to a hole 144a formed on the outer circumference of the second differential barrel 144 passes through a first cam groove 143b formed in the first rectilinear motion barrel 143, and engages a rectilinear motion groove 142c formed in the inner circumferential surface of the first differential barrel 142. A second rectilinear motion barrel 147 as a body component is incorporated inward from the second differential barrel 144, and this second rectilinear motion barrel 147 can slide with respect to a rotation of the second differential barrel 144 around the optical axis.

A plurality of key portions 147a are formed in circumferential direction on a flange portion 147b of the second rectilinear motion barrel 147, and these key portions 147a engage a plurality of rectilinear motion grooves 143c formed on the inner circumferential surface of the first rectilinear motion barrel 143.

In this configuration, when the first differential barrel 142 is rotated around the optical axis, the engaging action of the drive pin 151 and the rectilinear motion groove 142c as well as the engaging action of the male helicoids 144d of the second rectilinear motion barrel 144 and the second cam groove 143a of the first rectilinear motion barrel 143 advance and retract the second differential barrel 144 while rotating it around the optical axis. Here, the second rectilinear barrel 147 can slide with respect to a rotation of the second differential barrel 144, so that it is only advanced and retracted in the direction of the optical axis.

A first helicoid 145a, which is formed on the outer circumference of a first lens barrel 145 is engaged with second cam grooves 144b formed in the inner circumferential surface (FIG. 9) of the second differential barrel 144. Furthermore, three cam pins 148a provided on the outer circumference of a second lens holder 148 holding a second lens unit 152 are engaged with third cam grooves 144c formed in the inner circumferential surface (FIG. 9) of the second differential barrel 144.

When the second differential barrel 144 is rotated around the optical axis, the first lens barrel 145 is advanced or retracted in the direction of the optical axis due to the engaging action of the first helicoid 145a and the second cam grooves 144b, and can be moved to a predetermined position in accordance with the drive amount of the motor 108. Moreover, the second lens holder 148 is advanced or retracted in the direction of th optical axis due to the engaging action of cam pin 148a and the third cam grooves 144c, and can be moved to a predetermined position in accordance with the drive amount of the motor 108. A mask 155 is arranged in front of the second lens holder 148.

Furthermore, in FIGS. 2, and 4 to 6, since a correcting lens 401, a lens holder 402, a driving pin 403, and a moving spring 404 are components of a lens barrel in Embodiment 2 described later, detailed description will be performed in Embodiment 2.

The following is an explanation of the parts arranged around the shutter device.

In FIG. 2, a first lens unit 160 including four lenses is arranged inside the first lens holder 161, and a sponge 162 is disposed on an outer circumferential portion 161a of the first lens holder 161.

In addition, the image pickup optical system includes the first lens unit 160, second lens unit 152, and third lens unit 401.

Figure 1:
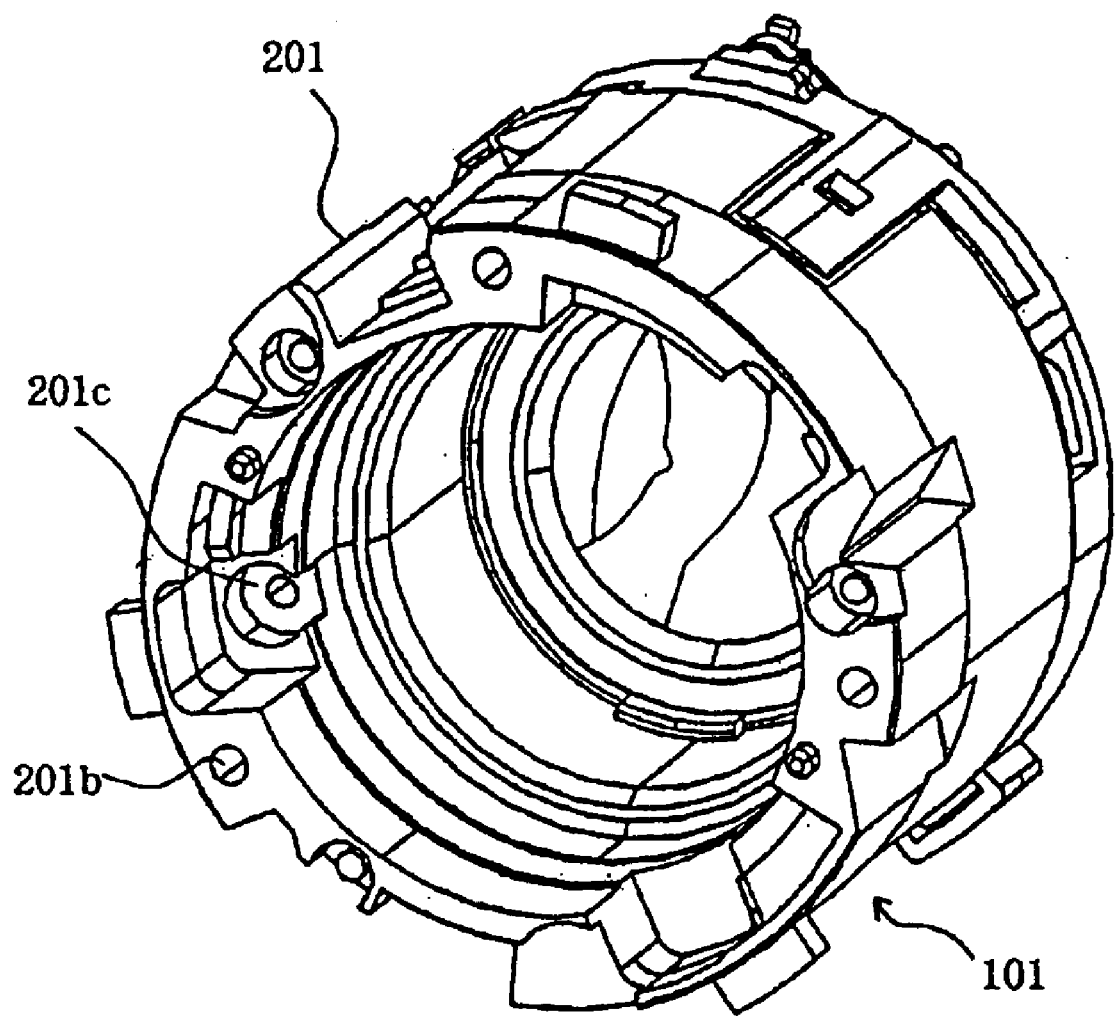
FIG. 1 is an external perspective view of a shutter apparatus.

The first lens holder 161 is disposed and fixed inside the first shutter base 201 in shutter apparatus 101 shown in FIG. 1. That is to say, a adjustment spring 163 is inserted between a recess 201c of the first shutter base 201 and an arm portion 161b formed in the outer circumference of the first lens holder 161, and the first lens holder 161 is fixed to the first shutter base 201 by screwing an adjustment screw 164 for a predetermined screwing amount in screw holes formed in the arm portion 161b and the recess 201c.

The shutter device 101 including the first shutter base 201 holding the first lens holder 161 is fastened by inserting it into the first lens barrel 145 from the rear side in FIG. 2. That is to say, the shutter device is fastened to the first lens barrel 145 by passing a screw (not shown in the drawings) through a hole 145b of the first lens barrel 145, and screwing it to a female screw portion 201b in the first shutter base 201. A cover 177 is fastened in front of the first lens barrel 145.

The following is an explanation of the structure and operation of a camera provided with a lens barrel of the above-described structure.

Figure 8:
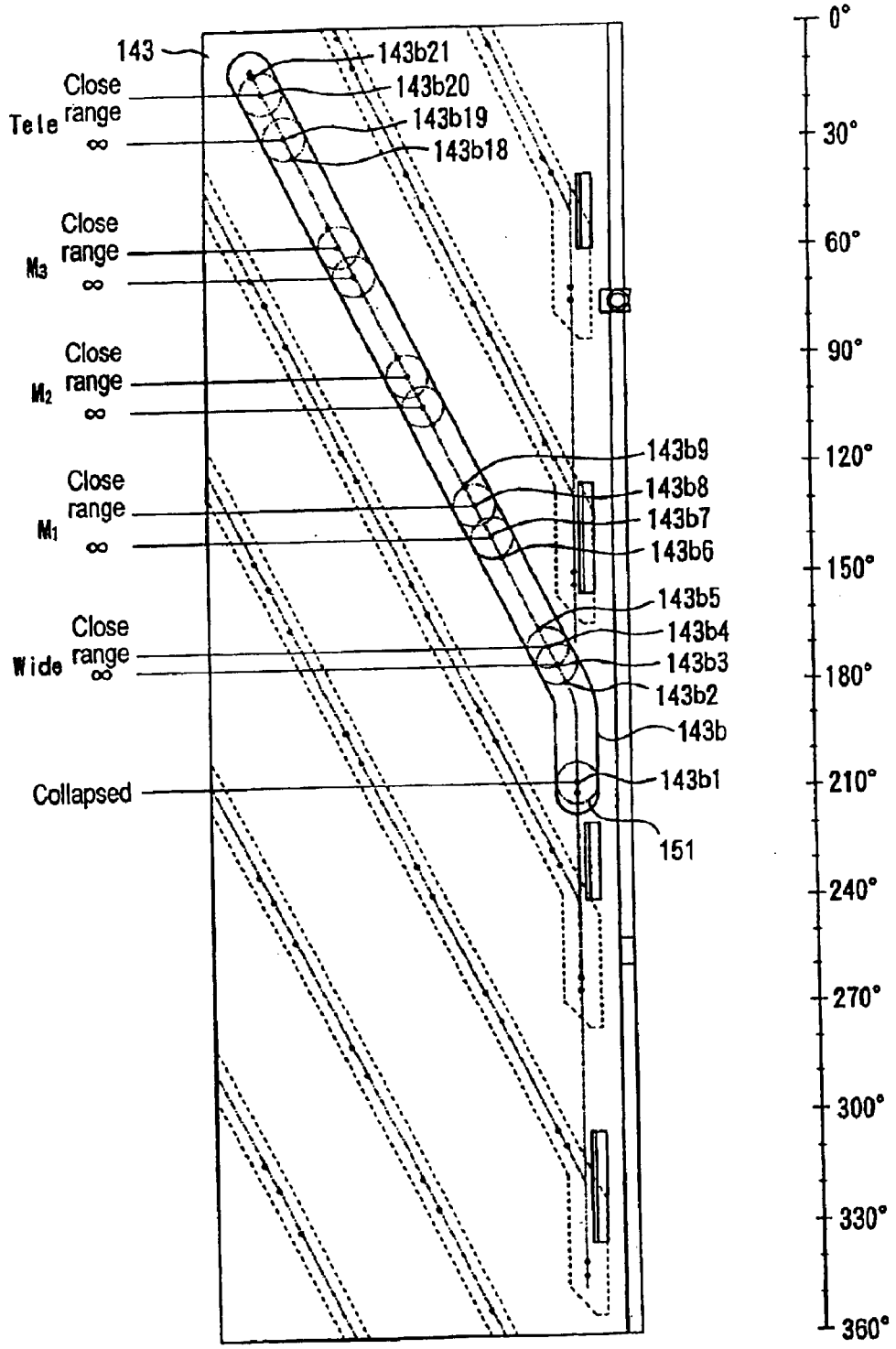
FIG. 8 is a developed view of a first rectilinear barrel.
Figure 9:
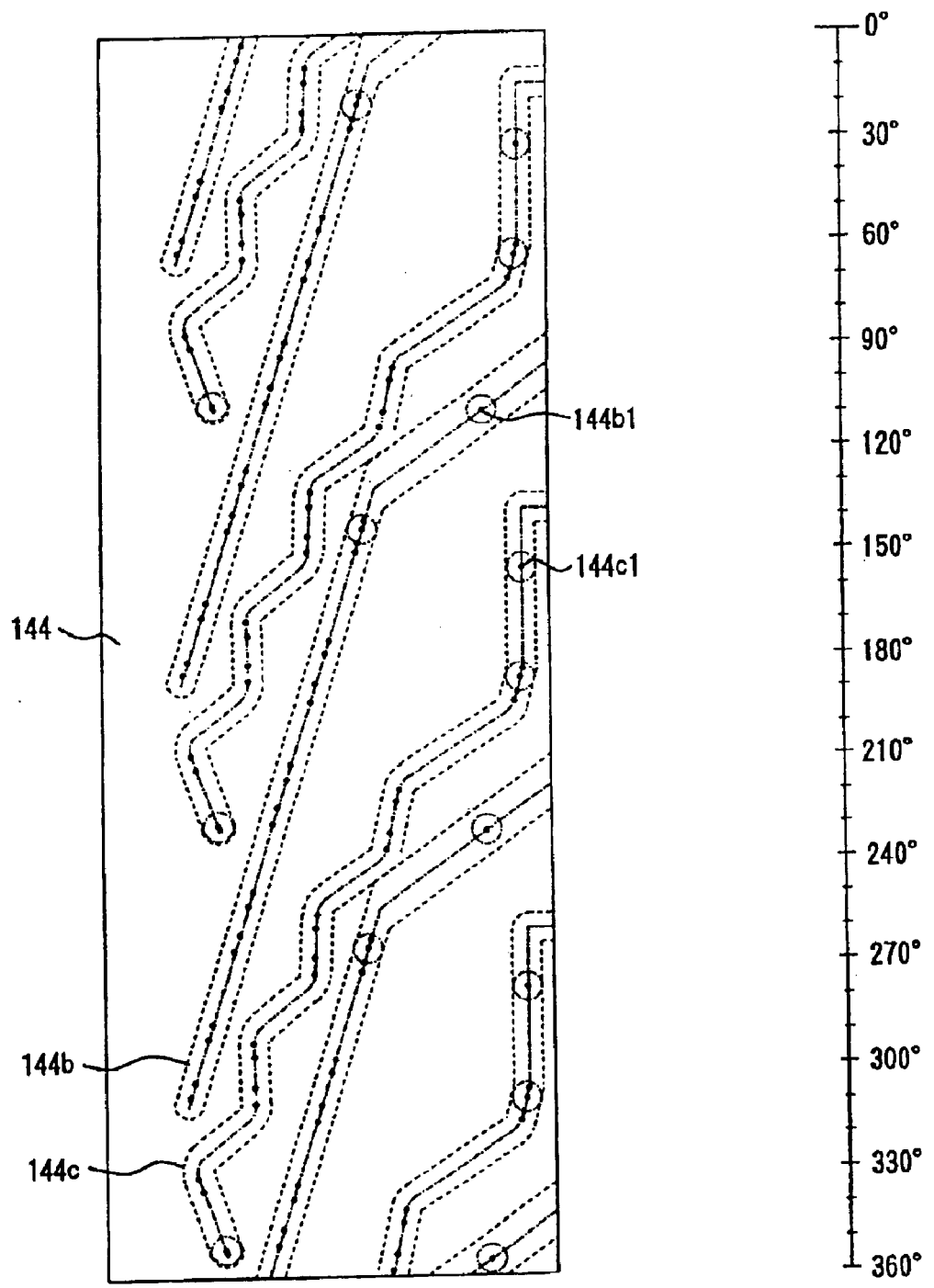
FIG. 9 is a developed view of a second differential barrel.

When the lens barrel is in the lens-barrel collapse state shown in FIG. 4, the first differential barrel 142, which is helicoidally coupled to the fixed barrel 141, does not protrude beyond the front face of the fixed barrel 141. In this situation, the drive pin 151 of the second differential barrel 144 is in the position marked as 143b1 in the first cam groove 143b of the first rectilinear motion barrel 143, as shown in FIG. 8.

Figure 10:
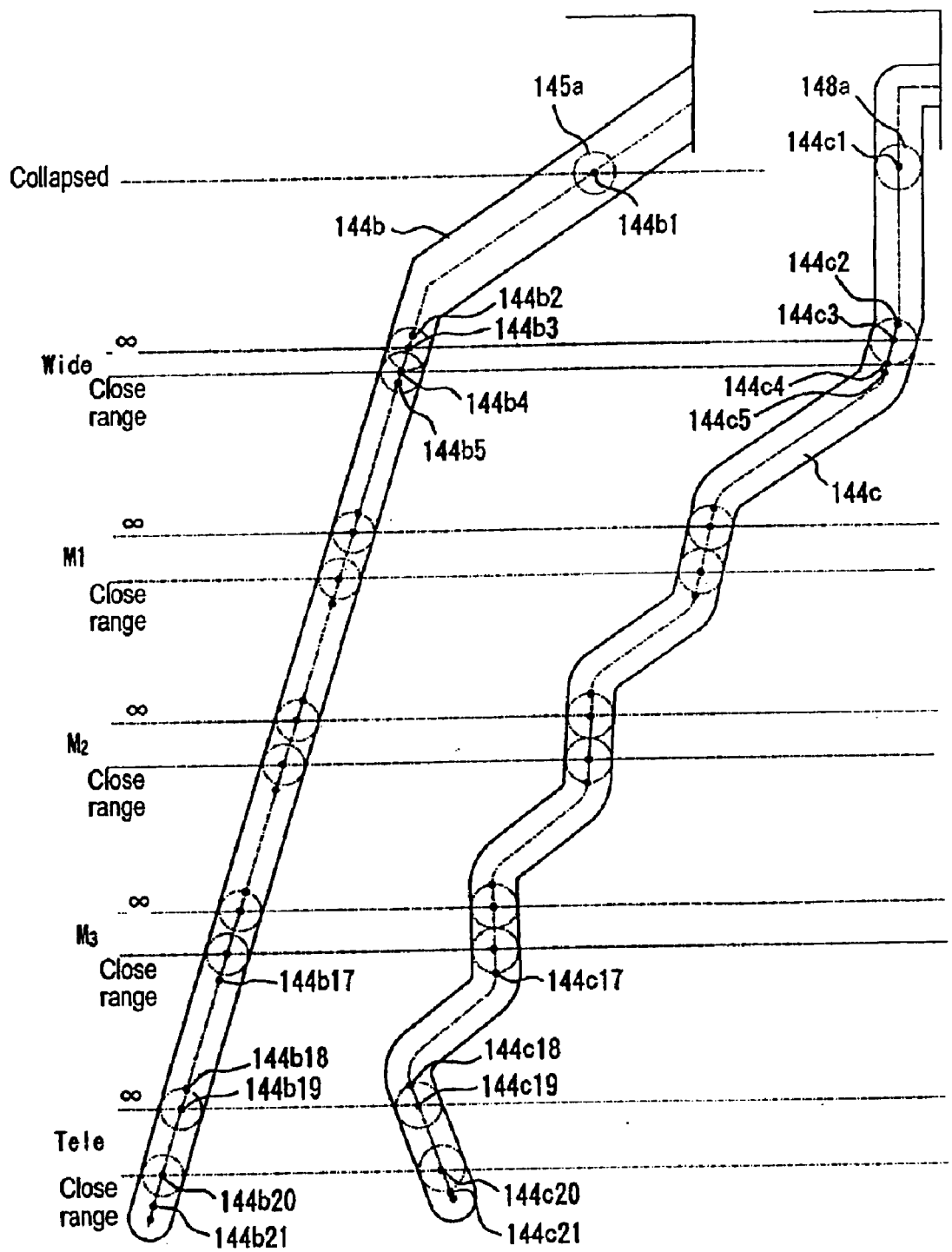
FIG. 10 is an explanatory diagram of loci of movable cams in respective lens groups of the second differential barrel.

The first helicoid 145a that is formed on the outer circumference of the first lens barrel 145 holding the first lens group 160 is in the position marked as 144b1 in the second cam groove 144b in the second differential barrel 144 shown in FIG. 10, and the first lens barrel 145 does not protrude the second differential barrel 144.

Furthermore, the three cam pins 148a provided on the outer circumference of the second lens holder 148 holding the second lens unit 152 are in the position marked as 144c1 in the third cam grooves 144c formed in the second differential barrel 144 as shown in FIG. 10.

Thus, when the lens barrel is in its lens-barrel collapse state, the first lens barrel 145 does not protrude from the fixed barrel 141.

As described above, a male helicoid and a gear are formed overlappingly on the outer circumferential rear portion 142a of the first differential barrel 142, and the gear meshes with the long face pinion 120. The long face pinion 120 is linked to the motor 108 via the gear train from the sixth gear 307 to the first gear 301.

In FIG. 4, numeral reference 301a denotes a pulse plate having a 6-blade propeller, numeral reference 122 denotes a PI (photo-interrupter) for detecting the passage of the propeller of the pulse plate 301a.

This PI 122 has a photo transmitter and a photo detector that face to each other, and outputs a predetermined signal by the propeller of the pulse plate portion 301a entering into or exiting from between the photo transmitter and photo detector according to the rotation of the first gear 301.

Numeral reference 110 denotes a pulse detection circuit detecting the output of the PI 122. Numeral reference 111 denotes a motor control circuit, constituting a motor forward rotation drive circuit in accordance with the output of the comparator 112a and a motor reverse rotation drive circuit in accordance with the output of the comparator 112b.

Numeral reference 130 denotes a release button provided with a two-step stroke structure, which outputs a first stroke or a second stroke status signal to a zooming signal processing circuit 115 in response to its operation by the camera operator.

Numeral reference 113 denotes a microcomputer which calculates a rotation amount of the first differential barrel 142 by output signals from a object distance detecting circuit 114 and the zooming signal processing circuit 115, and outputs a signal, corresponding to the calculation result as shown in the following Table 1, to a comparator 112a.

In the camera of this embodiment, switching between the following focal lengths is possible: wide (35 mm), M (middle) 1 (50 mm), M2 (70 mm), M3 (105 mm), and telephoto (150 mm).

TABLE 1

| lens focal length | | condition | signal output by the zooming signal processing circuit 115 signal | signal ouput by the object distance detecting circuit 114 object distance | signal | signal input into comp. 112a |
|---|---|---|---|---|---|---|
| Wide | actual focal length 35 mm | zoom direction W → T | 10 | 8 m | 0 | 10 |
| | | zoom direction W → T | 10 | 4 m | 1 | 11 |
| | | zoom direction | — | — | — | — |
| | | T → W release button at first stroke | 10 | 0.6 m | 9 | 19 |
| M1 | actual focal length 50 mm | zoom direction W → T | 20 | 8 m | 0 | 20 |
| | | zoom direction W → T | 20 | 4 m | 1 | — |
| | | zoom direction | — | — | — | — |
| | | T → W release button at first stroke | 20 | 0.6 m | 9 | 29 |
| M2 | actual focal length 70 mm | zoom direction W → T | 30 | 8 m | 0 | 30 |
| | | zoom direction W → T | 30 | 4 m | 1 | — |
| | | zoom direction | — | — | — | — |
| | | T → W release button at first stroke | 30 | 0.6 m | 9 | 39 |
| M3 | actual focal length 105 mm | zoom direction W → T | 40 | 8 m | 0 | 40 |
| | | zoom direction W → T | 40 | 4 m | 1 | — |
| | | zoom direction | — | — | — | — |
| | | T → W release button at first stroke | 40 | 0.6 m | 9 | 39 |
| Tele | actual focal length 150 mm | zoom direction W → T | 50 | 8 m | 0 | 50 |
| | | zoom direction W → T | 50 | 4 m | 1 | — |
| | | zoom direction | — | — | — | — |
| | | T → W release button at first stroke | 50 | 0.6 m | 9 | 59 |

Numeral reference 116 is a logic control circuit, which puts the motor forward rotation drive circuit of the motor control circuit 111 into an operation preparation state when the camera operator pushes the release button 130 down to the first stroke. On the other hand, when the camera operator stops the operation of the release button 130, the logic control circuit 116 puts the motor reverse rotation drive circuit of the motor control circuit 111 into an operation preparation state.

When the camera operator pushes the release button 130 down to the first stroke and turns on a power switch, the logic control circuit 116 outputs a start-up signal to a distance measurement module 117, and outputs a motor start-up signal to the motor control circuit 111 after a sufficient time has passed before terminating the distance measurement with the distance measurement module 117.

The range-finding module 117 receives the activation signal from the logic control circuit 116, and measures object distance.

The object distance detection circuit 114 converts the information concerning object distance, obtained by the distance measurement module 117 into a digital signal, and outputs to the microcomputer 113.

Numeral reference 118 denotes a zooming operation member, which is operated by the camera operator in order to change the focal length of the image pickup optical system over the range of 35 mm to 150 mm (from the wide-angle state to the telephoto state). The zooming signal processing circuit 115 detects the time that the zooming operation member 118 has been operated, converts the detection result outputs that number to the microcomputer 113.

Numeral reference 119a denotes a finder display control circuit, which displays predetermined information in a finder display portion (not shown in the drawings) that is provided in the camera body, based on control signals from the microcomputer 113. Numeral reference 119b denotes a magnetic recording circuit, which records predetermined image-taking information on a magnetic recording portion of the photographic film, based on control signals from the microcomputer 113.

In addition, though the camera that uses a film is described in each embodiment described above, it is possible to also apply the present invention to a camera that comprises an image pickup device such as a CCD. Here, in the camera that comprises the image pickup device, it is possible to record a shot picture and image pickup information in a recording medium (a tape, semiconductor memory, an optical disk, or the like) not shown.

Figure 5:
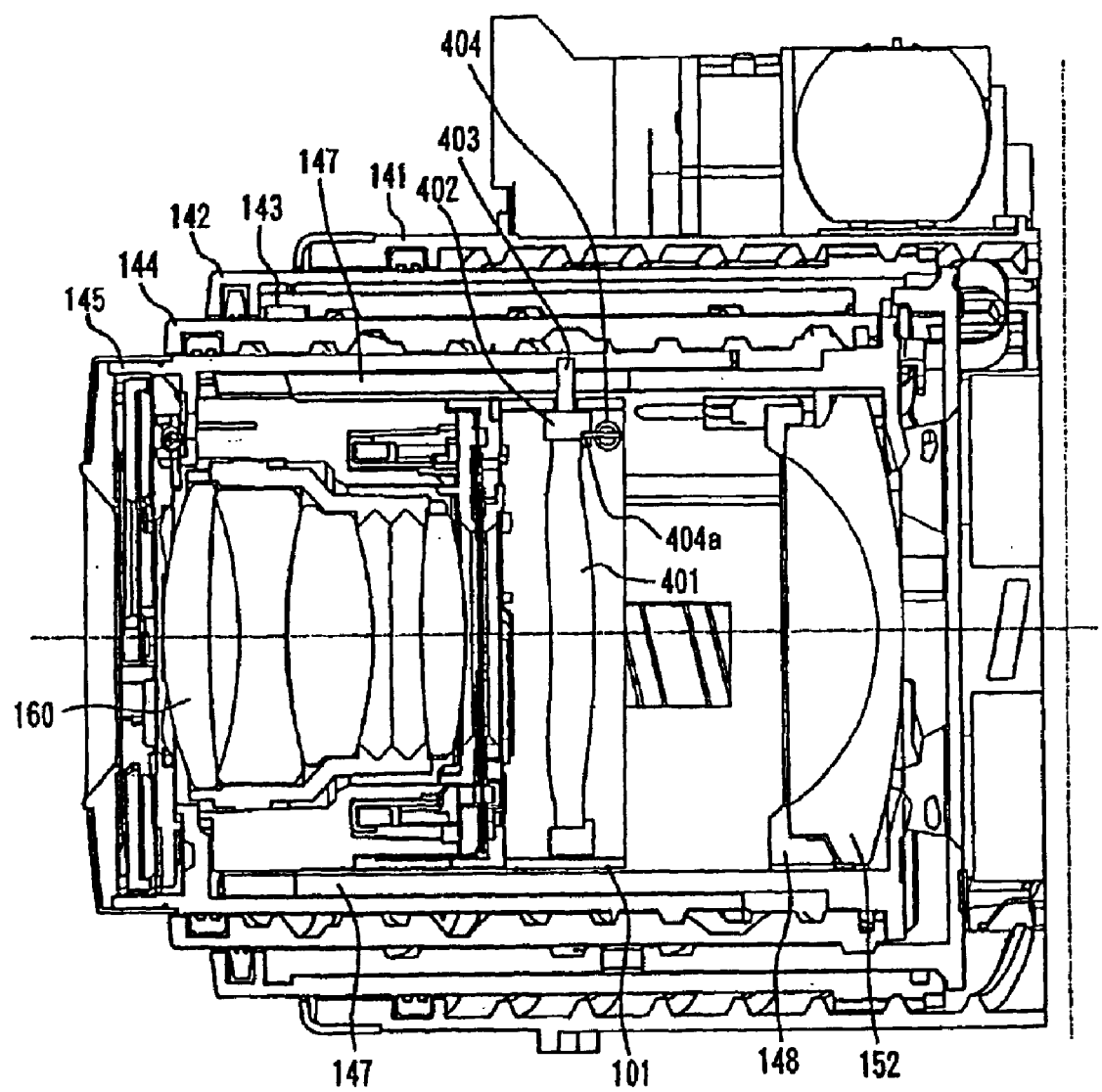
FIG. 5 is a sectional view of the lens barrel in a wide-angle state.

The following is an explanation of the operation of moving the lens barrel from the lens-barrel collapse state shown in FIG. 4 to the wide standby state shown in FIG. 5.

When the camera operator turns on a switch (not shown in the drawings) on the camera body 159, a drive force is transmitted from the motor 108 to the first differential barrel 142, and the first differential barrel 142 is thrust out in the direction of the optical axis while being rotated around the optical axis due to the engaging action with the fixed barrel 141.

After the drive pin 151 of the second differential barrel 144 has been moved temporarily from the position 143b1 to the position 143b5 in the first cam groove 143b in FIG. 8, it returns to the position 143b2. Thus, the second differential barrel 144 protrudes from the first rectilinear barrel 143 by a distance in the direction of the optical axis (right and left directions in FIG. 8) corresponding to the distance between the position 143b1 and the position 143b2.

Here, the driving pin 151 performs the operation similar to the above-described operation when the focal length of the image pickup optical system is made to be M1 to M3, or telephoto by the lens barrel's advancing in the direction of the optical axis. For example, when the focal length of the image pickup optical system is made to be M1, the driving pin 151 returns to a position 143b6 through positions 143b8 and 143b7 after once moving to a position 143b9 in the first cam grooves 143b. In addition, when the focal length of the image pickup optical system is made to be telephoto, the driving pin 151 returns to a position 143b18 through positions 143b20 and 143b19 after once moving to a position 143b21 in the first cam grooves 143b.

On the other hand, when the focal length of the image pickup optical system is changed by the lens barrel's retracting in the direction of the optical axis, the driving pin 151 does not perform the above-described operation, but stops at the time of moving to a predetermined stop position at each zoom position.

After the first helicoid 145a of the first lens barrel 145 has moved temporarily from the position 144b1 to the position 144b5 in the second cam groove 144b in FIG. 10, it returns to the position 144b2.

Figure 11:
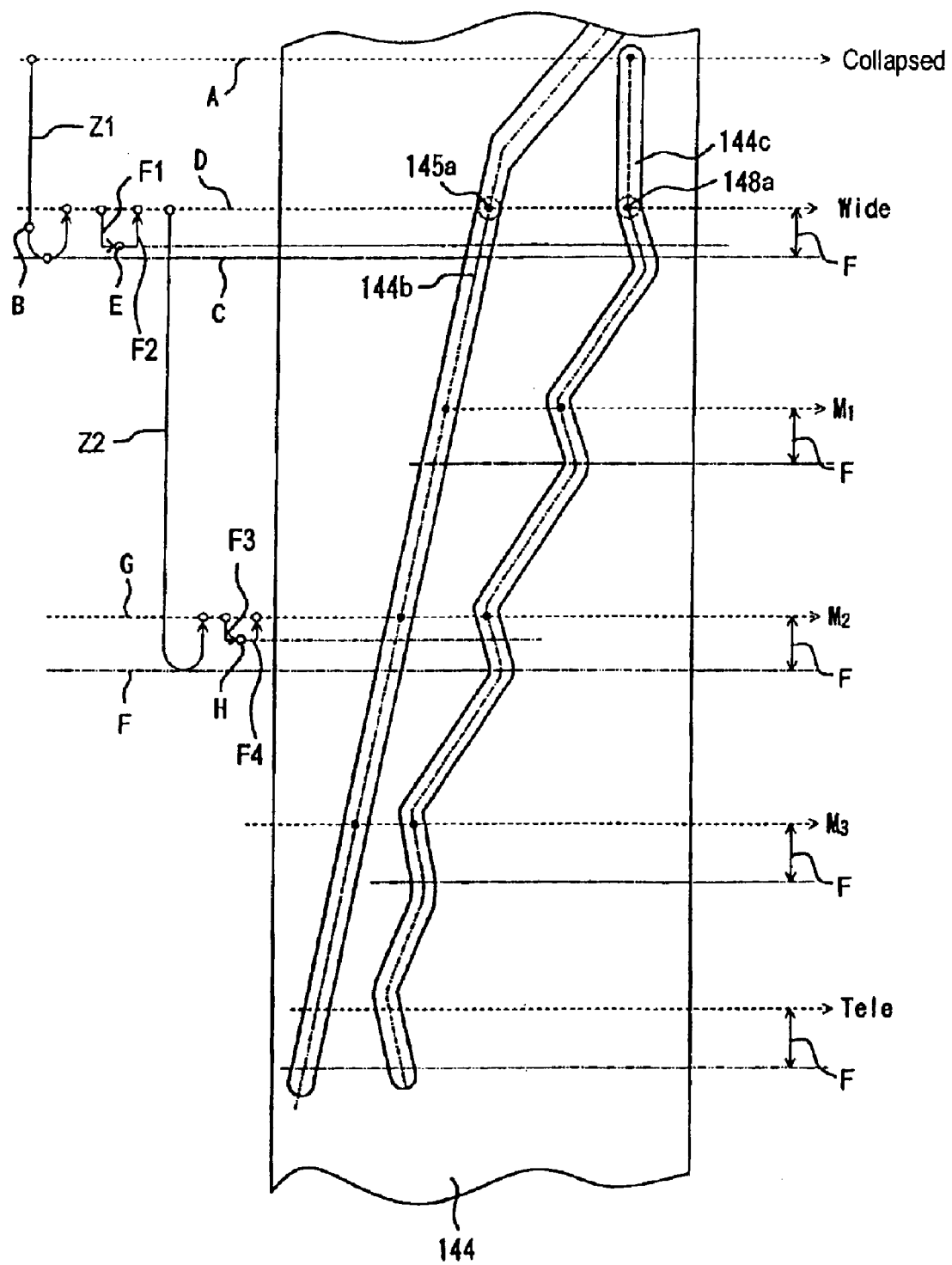
FIG. 11 is an explanatory diagram of zooming and focusing from the lens-barrel collapse state to a wide-angle stand-by state, and from the wide-angle stand-by state to an M2 state.

That is to say, as indicated by the arrow Z1 in FIG. 11, the first helicoid 145a is first moved, by rotating the motor 108 in one direction, from a position A through positions D and B to a position C. Then, by stopping the drive of them motor 108 and rotating the motor 108 in the reverse direction, it is returned from the position C to the position D. Stopping the first helicoid 145a in the D position, the lens barrel assumes the wide standby state.

Through the above-described operation, in FIG. 10, the first lens barrel 145 protrudes from the second differential barrel 144 by a distance in the direction of the optical axis (right and left directions in FIG. 10) corresponding to the distance between the position 144b1 and the position 144b2.

After cam pin 148a of the second lens holder 148 have been moved temporarily from the position 144c1 to the position 144c5 in the third cam grooves 144c in FIG. 10, they return to the position 144c2. Thus, the second lens holder 148 is pulled back in with respect to the second differential barrel 144 by a distance in the direction of the optical axis (right and left directions in FIG. 10) between the position 144c1 and the position 144c2.

Here, when the focal length of the image pickup optical system is changed by the lens barrel's advancing in the direction of the optical axis, the first helicoid 145a and pin 148a perform the operation of returning to a predetermined stop position after passing the predetermined stop position at each zoom position (the wide-angle, M1 to M3, or telephoto state). In addition, when the focal length of the image pickup optical system is changed by the lens barrel's retracting in the direction of the optical axis, the first helicoid 145a and pin 148a do not perform the above-described operation, but stop at the time of moving a predetermined stop position at each zoom position.

With this operation, the lens barrel is driven from the lens-barrel collapse state (FIG. 4) to the wide standby state (FIG. 5).

The following is an explanation of the image-taking operation of a camera when its lens barrel is in the wide-angle state.

When the lens barrel is in the wide-angle state and the camera operator pushes the release button 130 down to the first stroke, then the distance measurement module 117 performs a distance measurement in accordance with a signal output from the logic control circuit 116. Then, the measurement result of the distance measurement module 117 is sent to the object distance detection circuit 114, and after being converted into a digital signal, it is sent to the microcomputer 113. On the other hand, a digital signal indicating the focal length information (wide) during image-taking is given to the microcomputer 113 as the output of the zooming signal processing circuit 115.

The microcomputer 113 makes the calculation indicated in Table 1, in accordance with the output from the object distance detection circuit 114 and the zooming signal processing circuit 115. At a wide focal length of f=35 mm (output signal "10"), assuming that the object distance is for example 4 m (output signal "1"), and let the focal length of the image pickup optical system be f=35 mm that is a wide-angle state (output signal: "10"). Then, as shown in Table 1, the microcomputer 113 makes a memory section 113a store the numeral of "11" that is obtained by the AND operation of both signals, and makes this value be a reference value of the comparator 112a.

By rotating the motor 108 into one direction based on the signal output from the logic control circuit 116, the motor control circuit 111 rotates the first differential barrel 142 around the optical axis, such that the lens barrel is shifted from the wide-angle state toward the telephoto state. The rotation of the motor 108 is converted by the pulse plate 301a and the PI 122 into pulse signals, which are detected by the pulse detection circuit 110 and output to the comparator 112a.

The pulse signals are output one after the other from the PI 122, in accordance with the rotation in the forward direction of the motor 108, until eventually a pulse number of 11 is reached, whereupon the output of the comparator 112a is inverted and an end signal is output. Thus, the motor control circuit 111 electrically brakes the motor 108 and stops it by shorting the two terminals of the motor 108.

By controlling the rotation of the motor 108 in the above-described manner, the first differential barrel 142 is thrust out in the direction of the optical axis while being rotated around the optical axis due to the engaging action with the helicoid of the fixed barrel 141. In this situation, the drive pin 151 of the second differential barrel 144 moves along the first cam groove 143b as the first differential barrel 142 is rotated. Then, the drive pin 151 stops at a predetermined position in accordance with the object distance between the position 143b3 (infinity) and position 143b4 (close range) in the first cam groove 143b according to an amount of rotation of the motor 108 in FIG. 8.

In this situation, the helicoid 145a of the first lens barrel 145 moves to a predetermined position in accordance with the object distance between the position 144b3 (infinity) and position 144b4 (close range) in the second cam groove 14 in FIG. 10. That is to say, as shown by the arrow F1 in FIG. 11, the helicoid 145a at position D is moved to position E (predetermined position between D and C that corresponds to the object distance) in response to operating the release button 130 to the first stroke, and is then stopped.

Furthermore, cam pin 148a of the second lens holder 148 move to a predetermined position in accordance with the object distance between the position 144c3 (infinity) and position 144c4 (close range) in the third cam groove 144c in FIG. 10. That is to say, as shown by the arrow F1 in FIG. 11, the group 2 cam pins 148a at position D are moved to the position E in response to operating the release button 130 to the first stroke, and are then stopped.

Figure 12:
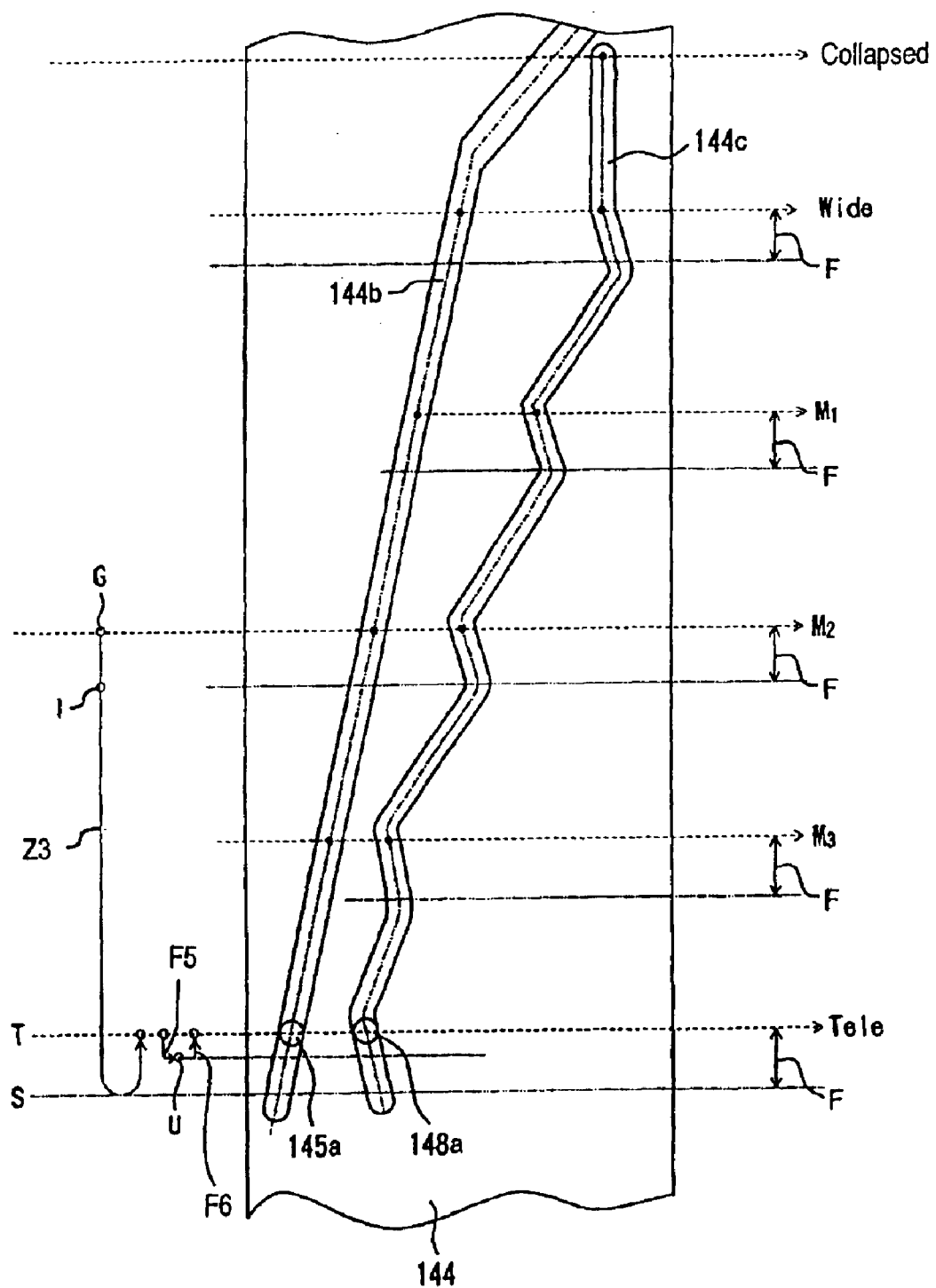
FIG. 12 is an explanatory diagram of zooming and focusing from the M2 state to the telephoto state.

In addition, in FIGS. 11 and 12, an area shown by the arrow F is an area for performing the focusing at each zoom position (the wide-angle, M1 to M3, or telephoto state).

Through this thrust-out operation of the lens barrel, the first lens unit 160 held by the first lens barrel 145 and the second lens unit 152 held by the second lens barrel 148 can be advanced and retracted in the direction of the optical axis, and the focus can be adjusted to the object between infinity and close range.

Furthermore, the operation of the focusing is not limited to the operation described above. For example, it is also possible o perform the focusing of the image pickup optical system by a known phase difference detection method or contrast detection method.

When the operator pushes the release button 130 down to the second stroke after the focus has been adjusted, a film (or, an image pickup device) is exposed by opening and closing the shutter blades. Then, when the release button 130 is restored to the state it was in before it was pushed by the camera operator, the motor 108 is rotated in the reverse direction with an output signal from the motor control circuit 111, which has obtained a command from the logic control circuit 116. Thus, the first differential barrel 142 is operated such that the lens barrel assumes the wide standby state, and is returned to the wide standby state before the focus adjustment.

Here, as indicated by the arrow F2 in FIG. 11, the first helicoid 145a of the first lens barrel 145 and the group 2 cam pins 148a of the group 2 lens holder 148 in position E are returned to and stopped at the position D. When the first differential barrel 142 has returned to the wide standby state, the comparator 112b is inverted and the drive of the motor 108 is stopped. Then, the photographic film is transported forward by one frame by a film transport mechanism as known in the art, and the camera assumes the state it was in before the release button 130 was operated.

In addition, in the case of a digital camera, image data that is read from an image pickup device and is given the predetermined image processing by an image processing circuit not shown is recorded in a recording medium.

It should be noted that in the present embodiment, five zoom positions with focal lengths of 35 to 150 mm are provided, but it is also possible to provide a larger or a smaller number of zoom positions.

Moreover, in this embodiment, the pulse plate 301a and the pulse detection circuit 110 are provided to perform the position detection of a lens unit constituting an image pickup optical system and to determine the stop timing of the motor 108, but there is no limitation to this.

For example, it is also possible to determine the stop position of the lens unit by using a pulse motor as the motor 108 and rotating this pulse motor in accordance with a number of output pulses given by the microcomputer 113. This way, it is not necessary to use the pulse plate 301a, the pulse detection circuit 110 and the comparator 112a, and the position of the lens unit can be controlled by directly inputting the output of the microcomputer 113 into the motor control circuit 111.

The following is an explanation of the zooming operation when switching the zoom position from wide to M2, and of an image-taking operation at M2.

When the lens unit is at the wide state, and the operator has continuously operated the zooming operation member 118 for a predetermined time so that the zooming signal processing circuit 115 has determined that the zoom position is M2, then the motor 108 is rotated in the forward direction in order to move the lens unit to a position corresponding to M2. Thus, as indicated by the arrow Z2 in FIG. 11, the helicoid 145a and cam pin 148a are moved from the position D through the positions C and G to the position F.

When the helicoid 145a and cam pin 148a move to the position F, the helicoid 145a and cam pin 148a are returned to the position G by stopping the rotation of the motor 108 to rotate in the other direction.

When the lens barrel is in the M2 state and the camera operator pushes the release button 130 of the camera body down to the first stroke, the microcomputer 113 drives the motor 108 in order to adjust the focus in accordance with the object distance. The drive force of the motor 108 is transmitted to the first differential barrel 142, and the helicoid 145a of the first lens barrel 145 is moved from the position G to the position H (predetermined position between G and I that corresponds to the object distance) in the second cam grooves 144b, as indicated by the arrow F3 in FIG. 11.

Furthermore, cam pin 148a of the second lens holder 148 move from the position G to the position H (a specific position corresponding to the object distance) in the third cam grooves 144c, as indicated by the arrow F3 in FIG. 11.

Focus adjustment is carried out by moving the helicoid 145a and cam pin 148a to the position H. Then, when the release button 130 is pushed do to the second stroke, exposure is performed by opening and closing the shutter blades. After the exposure operation has finished, the helicoid 145a and cam pin 148a are moved to the position G as shown by an arrow F4 in FIG. 11, and the film is transported forward by one frame.

Figure 6:
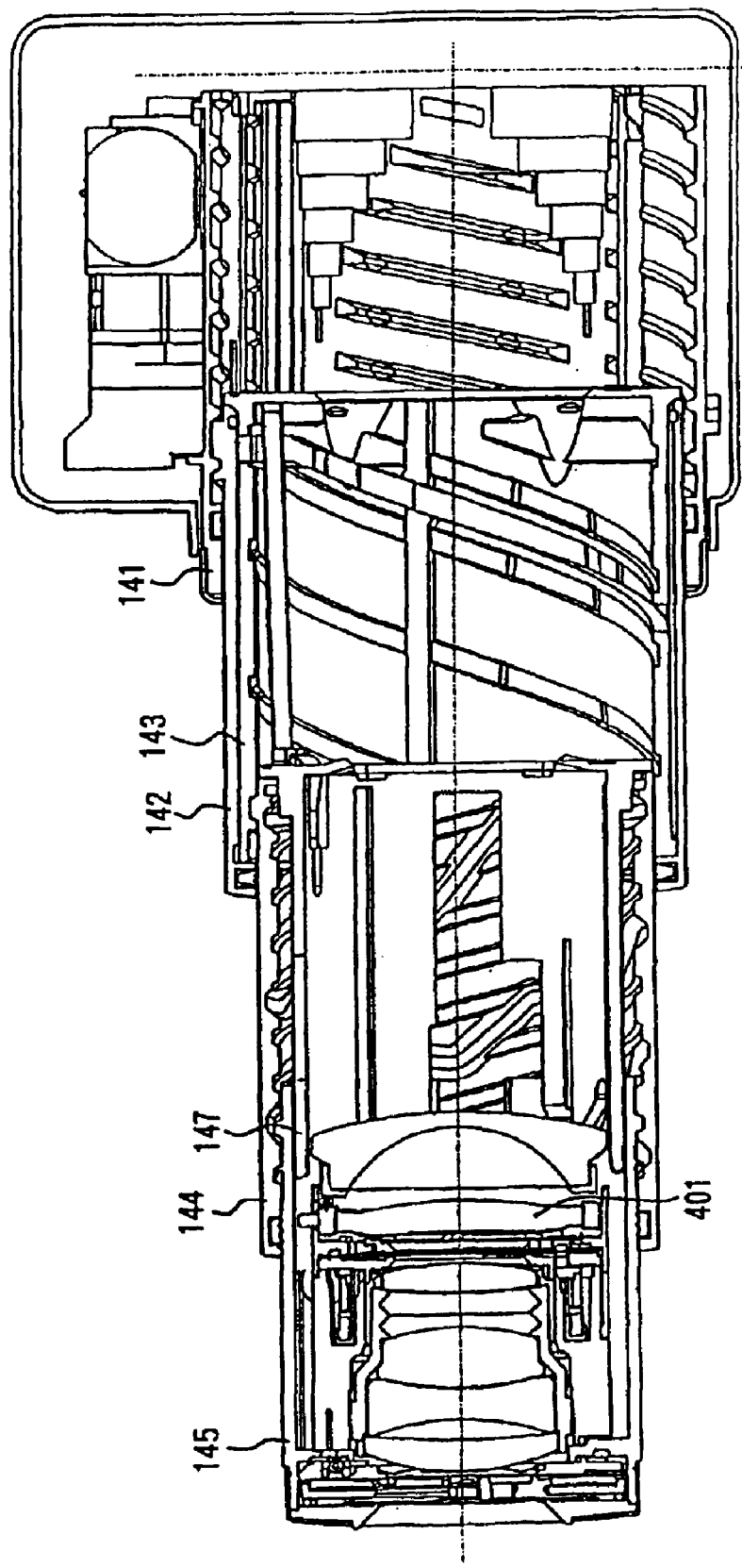
FIG. 6 is a sectional view of the lens barrel in a telephoto state.

The following is an explanation of the zooming operation when switching the zoom position from M2 to telephoto, and of an image-taking operation in the telephoto state (FIG. 6).

When the lens unit is at the M2 position, and the operator has continuously operated the zooming operation member 118 for a predetermined time, the zooming signal processing circuit 115 determines the zoom position. Here, if the zoom operation member 118 is operated in the direction toward the telephoto end and the operation time is at least 0.6 sec, then it is determined that the zoom position is the telephoto state.

When determining that the zoom position is the telephoto state, the zooming signal processing circuit 115 makes the motor 108 rotated in one direction so as to move the lens unit to a position corresponding to the telephoto state. Owing to this, the helicoid 145a and cam pin 148a that exist in the position G, as shown by the arrow F3 in FIG. 12, moves to the position S (positions 144b21 and 144c21 in FIG. 10) through positions I and T.

When the helicoid 145a and cam pin 148a move to a position S, the motor 108 is stopped and is rotated in the other direction. Hence, the helicoid 145a and cam pin 148a are returned to the position T (positions 144b18 and 144c18 in FIG. 10).

When the lens barrel is in the telephoto state and the camera operator pushes the release button 130 of the camera body down to the first stroke, the microcomputer 113 drives the motor 108 in order to adjust the focus in accordance with the object distance. The drive force of the motor 108 is transmitted to the first differential barrel 142, and the helicoid 145a of the first lens barrel 145 is moved from the position T to the position U (a specific position corresponding to the object distance: a specific position between positions 144b19 and 144b20 in FIG. 10) in the second cam grooves 144b, as indicated by the arrow F5 in FIG. 12.

Furthermore, the group 2 cam pins 148a of the group 2 lens holder 148 move from the position T to the position U (a specific position between the positions 144c19 and 144c20 in FIG. 10) in the third cam grooves 144c, as indicated by the arrow F5 in FIG. 12.

Focus adjustment is carried out by moving the helicoid 145a and cam pin 148a to the position U. Then, when the release button 130 is pushed do to the second stroke, exposure is performed by opening and closing the shutter blades. After the exposure operation has finished, the helicoid 145a and cam pin 148a are moved to the position T as shown by the arrow F6 in FIG. 12, and the film is transported forward by one frame.

Next, a barrier mechanism that is arranged in a point of the lens barrel and protects a front face of the lens unit will be described. The structure of this barrier mechanism will be described by using FIGS. 15 to 17 in order of assembling.

Figure 16:
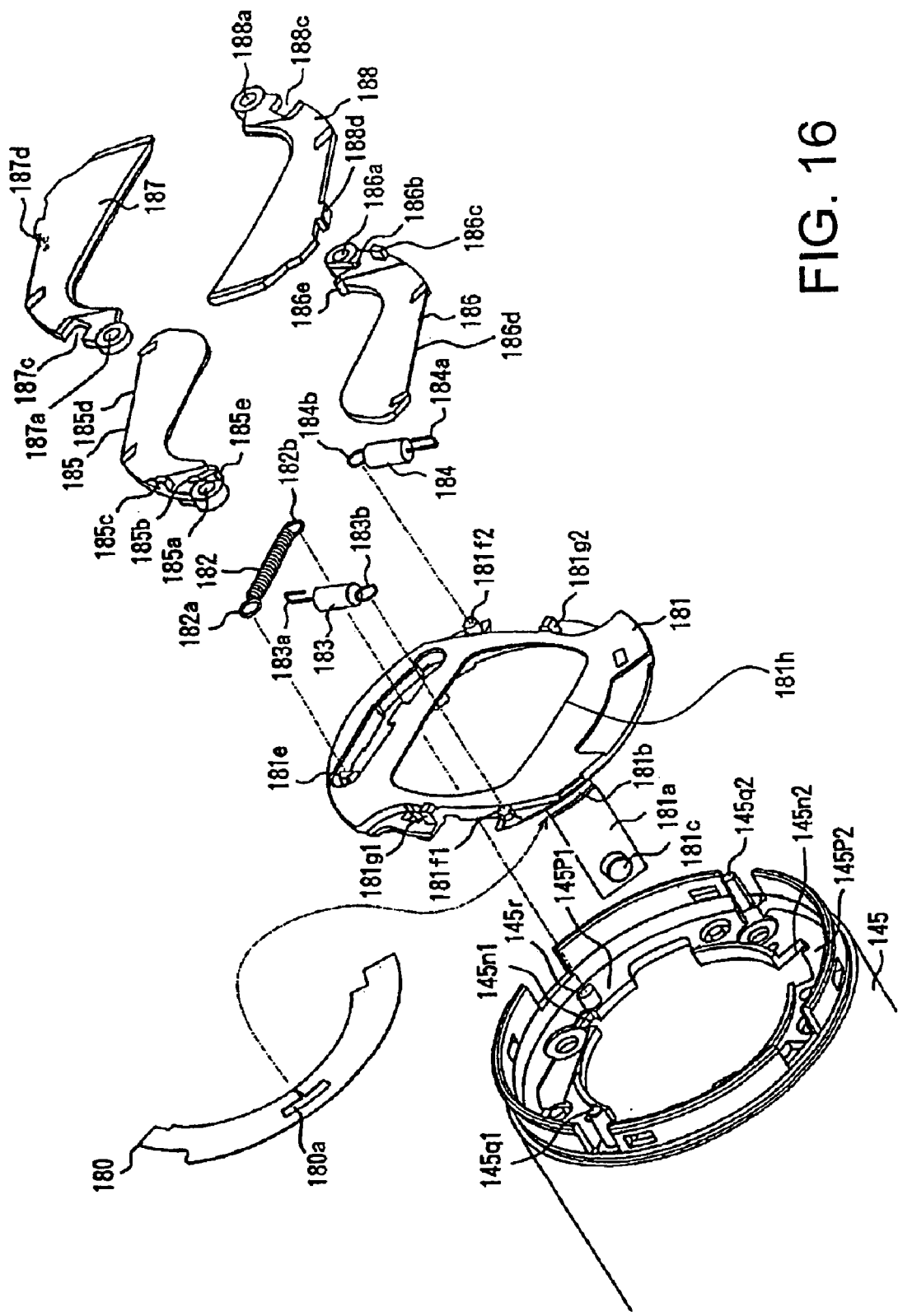
FIG. 16 is an exploded schematic enlarged diagram of the barrier mechanism.

In FIG. 16, a barrier sheet 180 and a barrier ring 181 are integrated by fitting a notched hole portion 180a of the barrier sheet 180 into a base portion 181b in an arm portion 181a of the barrier ring 181. Here, a convex junction 181c is formed in the arm portion 181a.

Figure 17:
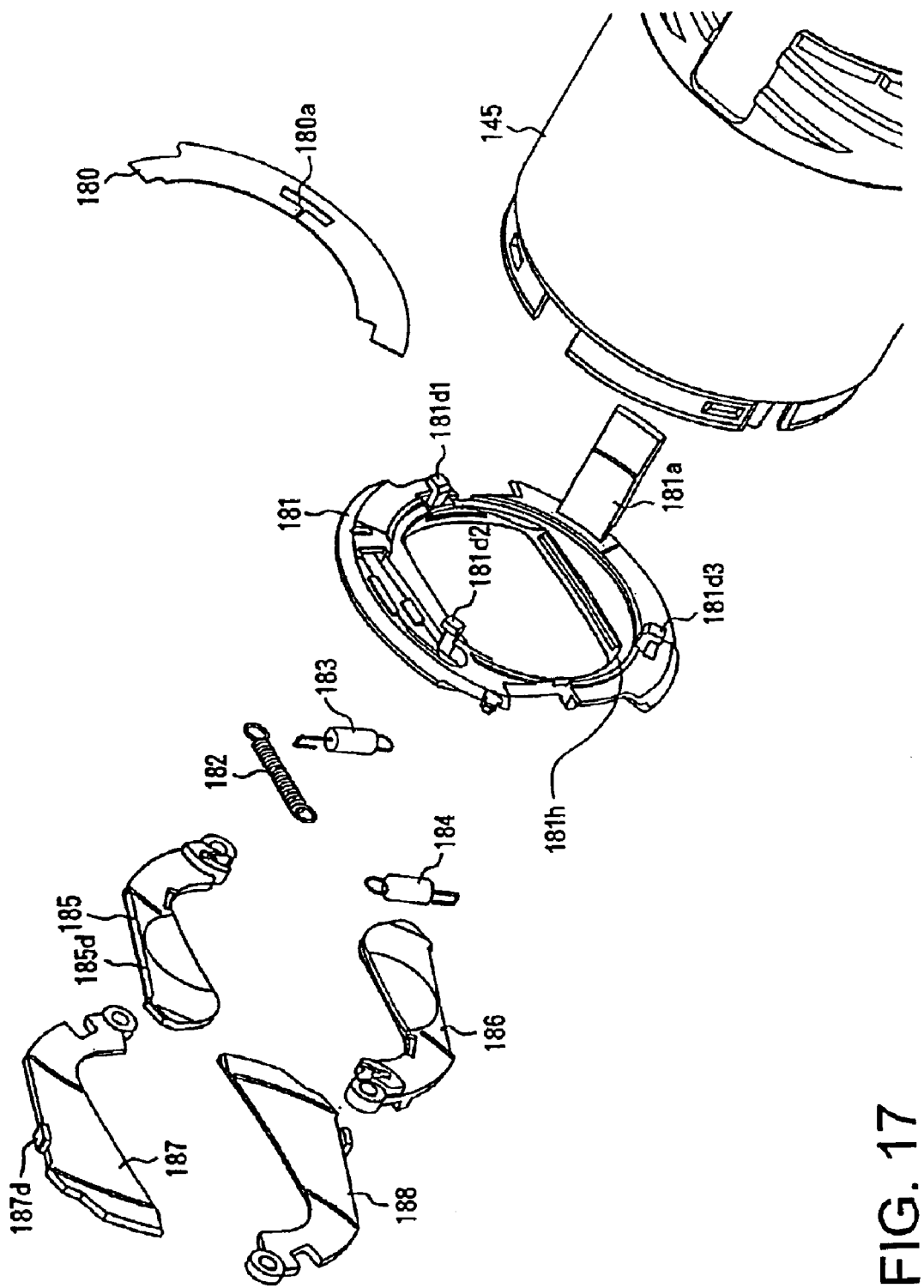
FIG. 17 is an exploded schematic rear view of the barrier mechanism.

In the outer circumferential surface of an aperture portion 181h formed in the barrier ring 181, as shown in FIG. 17, three hook portions 181d1, 181d2, and 181d3 are formed, which are built into three relief concavities 145n1 and 145n2 (a residual one is not shown) for assembling that are formed in the first lens barrel 145. In addition, the relief concavity not shown is formed in the same shape as those of the relief concavities 145n1 and 145n2.

Then, by relatively rotating the barrier ring 181 and first lens barrel 145, the three hook portions 181d1 to 181d3 of the barrier ring 181 engage with three rib portions 145p1 and 145p2 (a residual one is not shown) formed in the first lens barrel 145. In this structure, the barrier ring 181 is held by the first lens barrel 145 rotatably.

A round hook portion 182a of an opening spring 182 is hooked to a spring hook portion 181e of the barrier ring 181, and a round hook portion 182b is hooked to a spring hook portion 145r of the first lens barrel 145.

A first barrier blade 185 is rotatably installed in the first lens barrel 145 by fitting this hole portion 185a to a shaft 145q1 of the first lens barrel 145. A rectangular hook portion 183a of a closing spring 183 is hooked by a hole portion 185b of the first barrier blade 185, and a round hook portion 183b is hooked by a hook portion 181f1 of the barrier ring 181.

The first barrier blade 185 stops in a position, where a projection 185e makes contact with a projection 181g1 of the barrier ring 181, by receiving a spring force of the closing spring 183.

A second barrier blade 186 and a closing spring 184 are also built in the first lens barrel 145 similarly to the first barrier blade 185 and closing spring 183. Namely, a hole portion 186a of the second barrier blade 186 is fit in a shaft 145q2. In addition, a rectangular hook portion 184a of the closing spring 184 is hooked by a hole portion 186b of the second barrier blade 186, and a round hook portion 184b is hooked by a hook portion 181f2 of the barrier ring 181.

Owing to this, the second barrier blade 186 stops in a position that a projection 186e makes contact with a projection 181g2 of the barrier ring 181 by receiving the spring force of the closing spring 184.

A third barrier blade 187 is rotatably installed in the first lens barrel 145 since this hole portion 187a is fit into the shaft 145q1 of the first lens barrel 145. Here, a convexity 185c of the first barrier blade 185 is located in a concavity 187c of the third barrier blade 187. In addition, a convexity 187d of the third barrier blade 187 is located in the side (a side apart from the optical axis that passes the center of an aperture portion 181h) outer than an outer edge portion 185d of the first barrier blade 185.

A fourth barrier blade 188 is also built in the first lens barrel 145 similarly to the third barrier blade 187. Namely, a hole portion 188a of the fourth barrier blade 188 is fit in the shaft 145q2. Here, a convexity 186c of the second barrier blade 186 is located in a concavity 188c of the fourth barrier blade 188, and a convexity 188d of the fourth barrier blade 188 is located in the side (a side apart from the optical axis) outer than an outer edge portion 186d of the second barrier blade 186.

Figure 15:
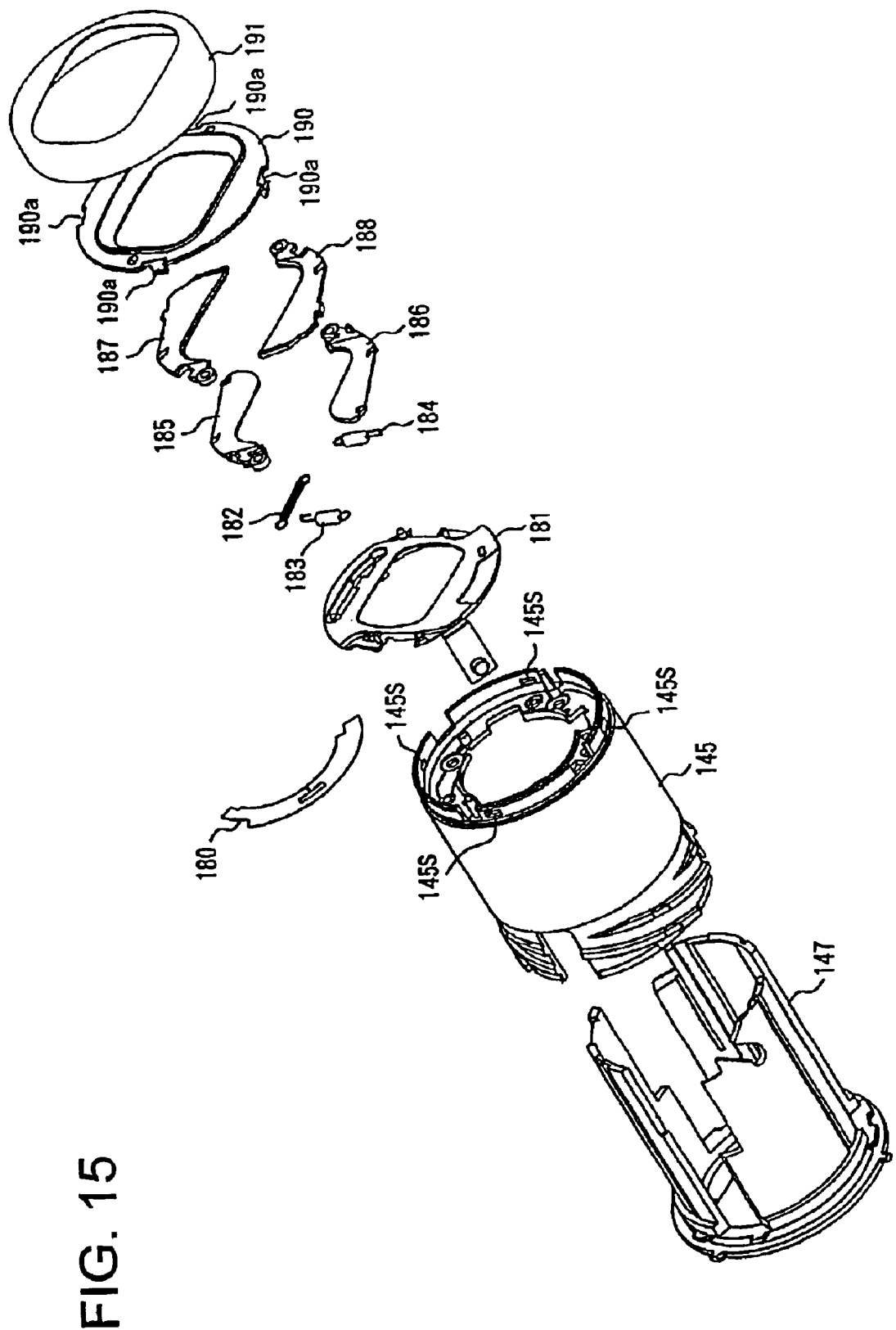
FIG. 15 is an exploded perspective view of a barrier mechanism.

In FIG. 15, the barrier cover 190 is fixed in a state of being positioned in the first lens barrel 145 by press-fitting four hook portions 190a, formed in this outer circumference, into four rectangular hole portions 145s formed in the circumferential direction of the first lens barrel 145.

The cover 191 is bonded and fixed to the first lens barrel 145 in a state of covering the barrier cover 190 from the front of the lens barrel.

Next, a state of the barrier mechanism at the time when the lens barrel is in the image-taking state (telephoto state) will be described.

Figure 13:
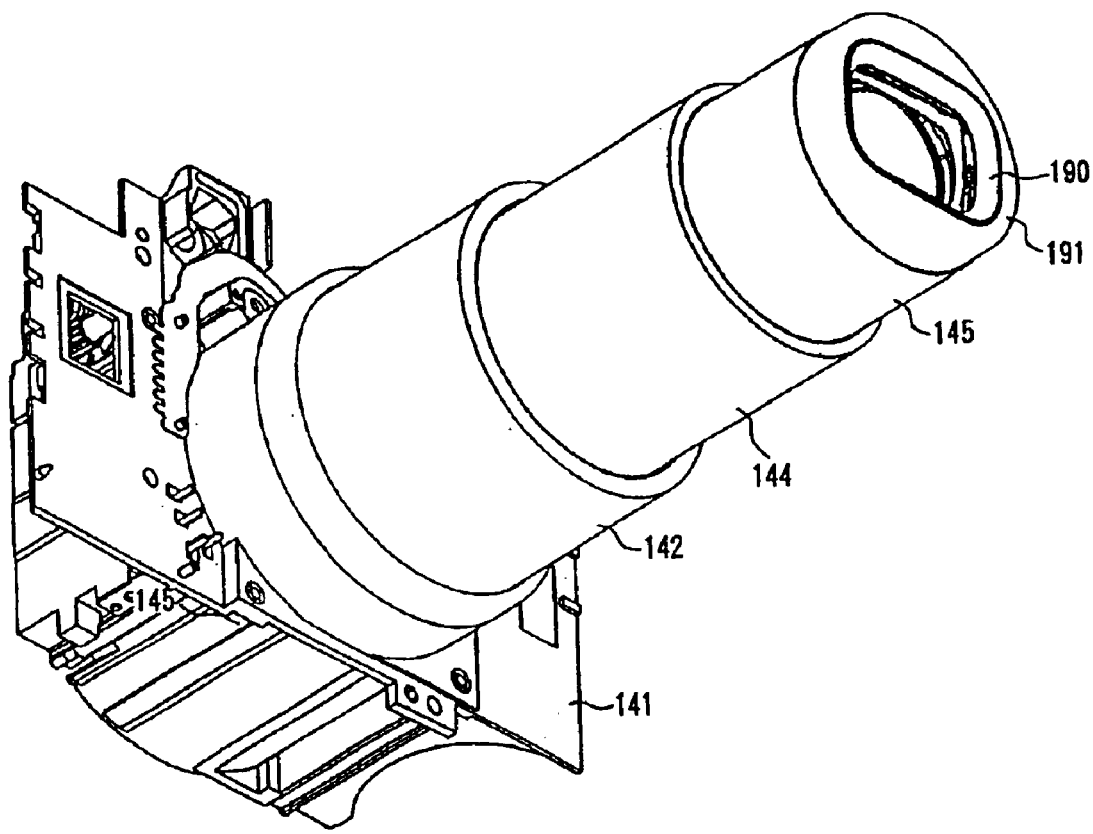
FIG. 13 is an external perspective view of the lens barrel in a telephoto stand-by state.
Figure 14:
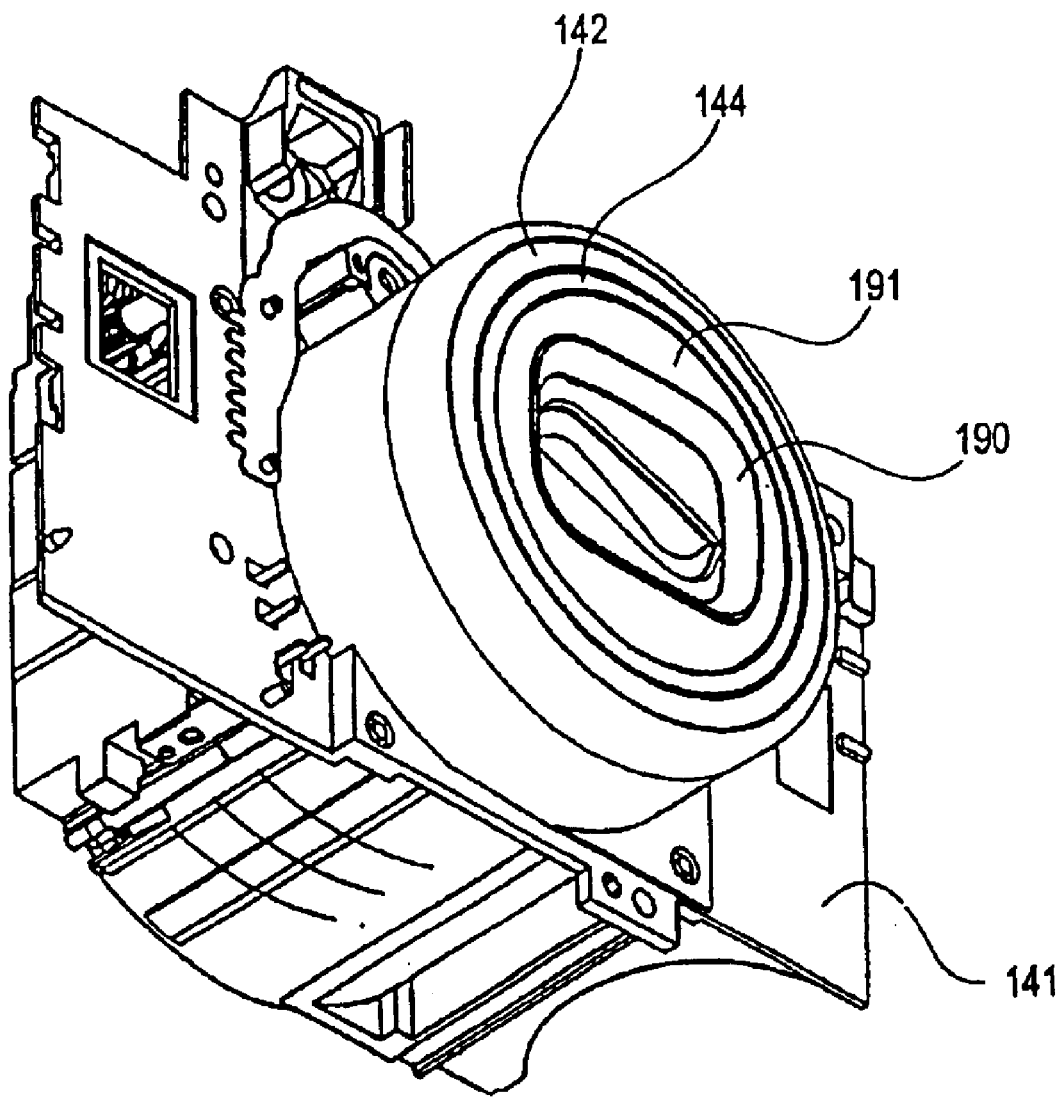
FIG. 14 is an external perspective view of the lens barrel in a wide-angle stand-by state.
Figure 18:
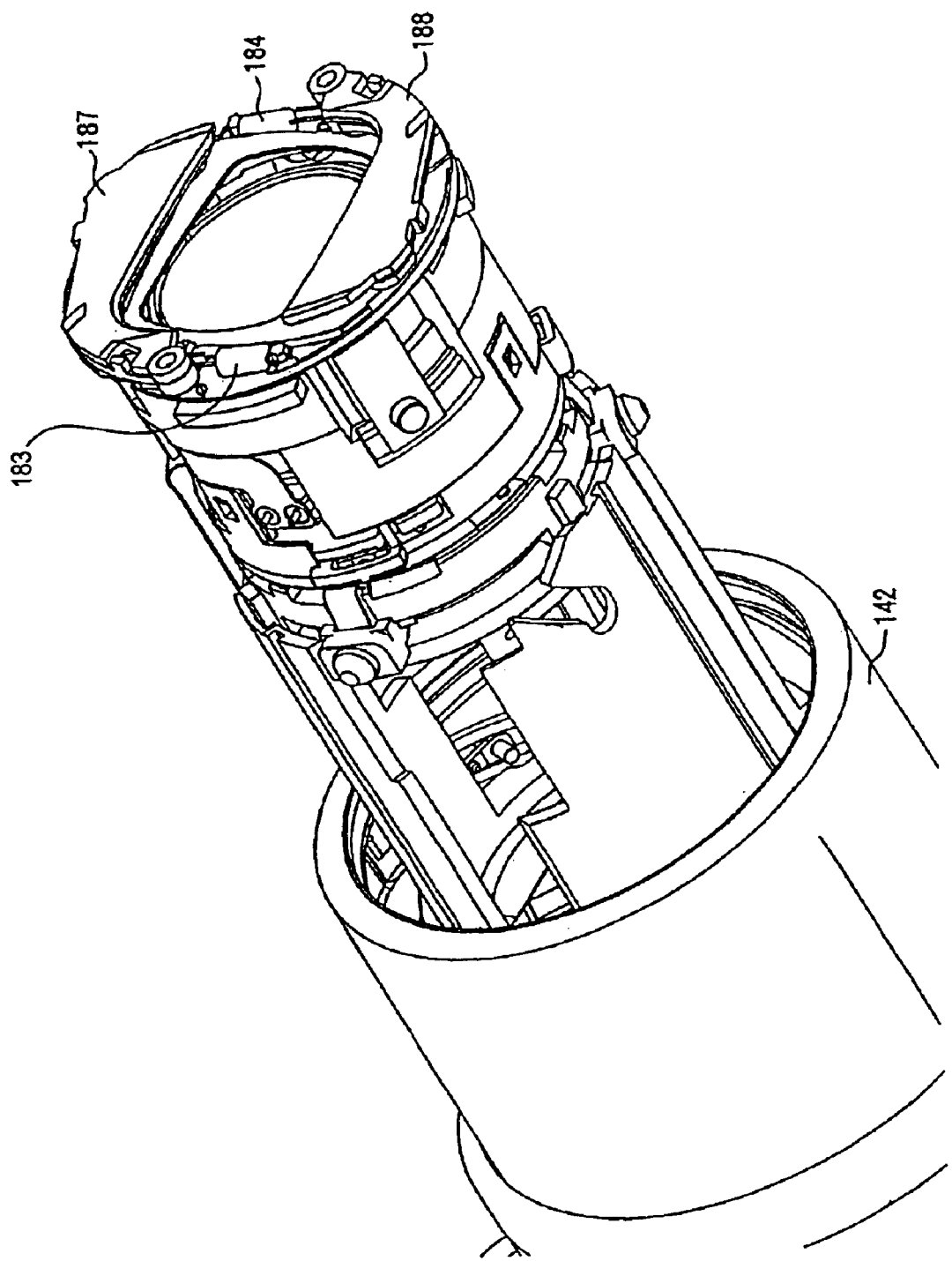
FIG. 18 is an internal structural perspective view of the lens barrel in a telephoto stand-by state.

FIG. 13 is an external perspective view of the lens barrel in the telephoto stand-by state, and FIG. 18 is an internal structural perspective view of the lens barrel in the telephoto stand-by state. Here, FIG. 18 is a perspective view drawn by omitting the barrier cover 190, cover 191, first lens barrel 145, and second differential barrel 144 from the lens barrel shown in FIG. 13, and the barrier mechanism is arranged in a front end of the lens barrel.

Figure 19:
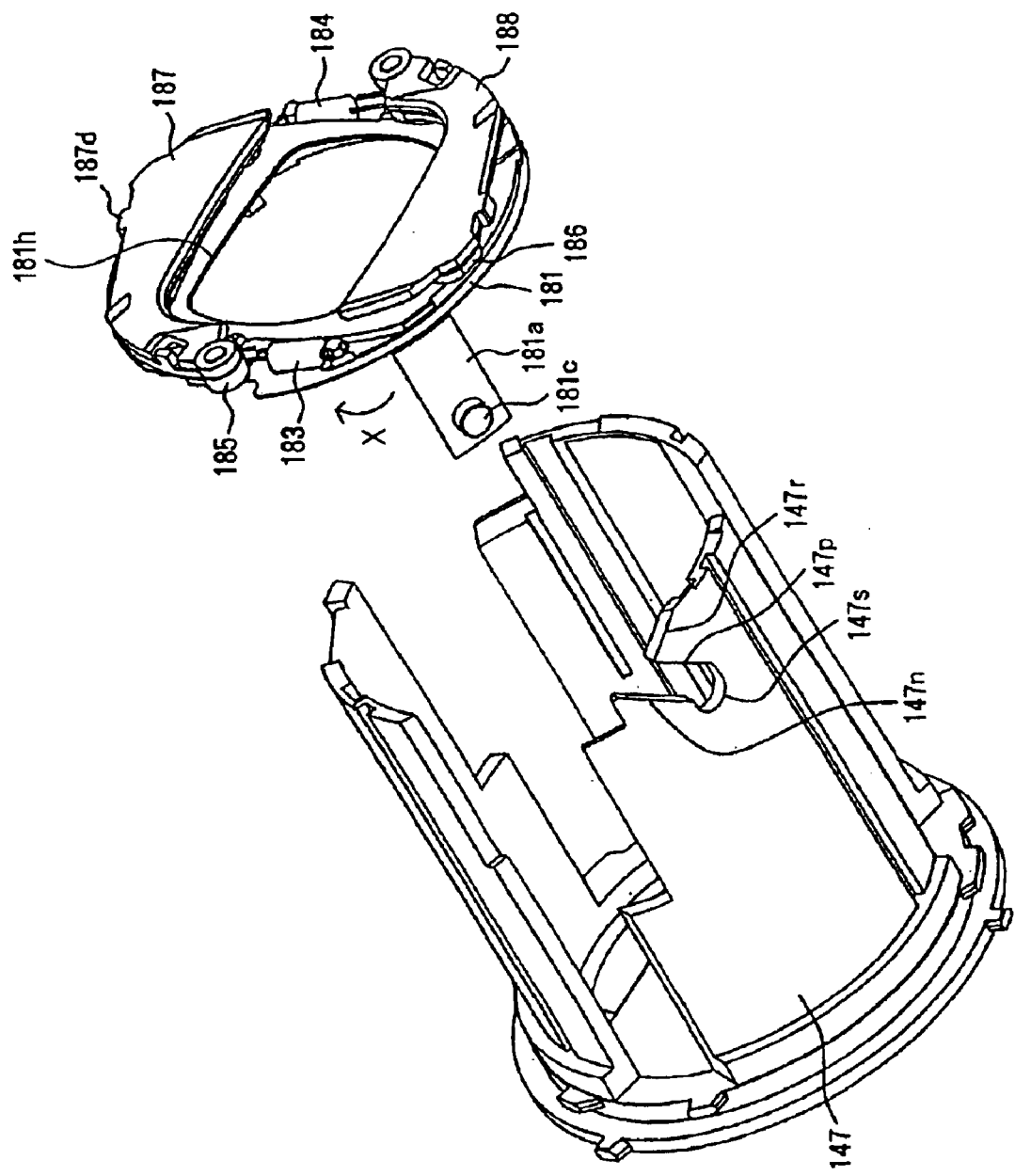
FIG. 19 is a partially structural perspective view of the barrier mechanism in the telephoto state.

FIG. 19 is a perspective view showing only the members that relate to opening and closing actions of the barrier blades 185 to 188, and show the positional relation between the barrier mechanism (barrier ring 181) and the second rectilinear barrel 147 in the direction of the optical axis when the lens barrel is in the telephoto state.

The second rectilinear barrel 147 has the first cam face 147n (a second guide portion), and in the state shown in FIG.

19, the first cam face 147n is located on an extension of a cylindrical junction 181c in the direction of the optical axis. In addition, the second rectilinear barrel 147 has a second cam face 147p (a first guide portion) facing the first cam face 147n with keeping the parallelism to the first cam face 147n.

The distance between the first cam face 147n and second cam face 147p is made to be larger than the diameter of the junction 181c. Here, in the case that the distance between the first cam face 147n and second cam face 147p is smaller than the diameter of the junction 181c, the normal operation of the lens barrel is impeded since the junction 181c is blocked between the first cam face 147n and second cam face 147p.

Then, owing to the structure like this embodiment, when the junction 181c makes contact with either of the first cam face 147n and second cam face 147p, it does not makes contact with another, and hence, the normal operation of the lens barrel can be secured.

On the other hand, in an end of the second cam face 147p, a third cam face 147r (a third guide portion) is successively formed. This third cam face 147r has extended in the direction of intersecting with a slope formed by the first cam face 147n and second cam face 147p.

A cam extension 147s is formed successively in the other end of the first cam face 147n and second cam face 147p, and extends in the direction of the optical axis.

In the telephoto state shown in FIG. 19, a gap between the barrier ring 181 and second rectilinear barrel 147 in the direction of the optical axis is apart, and the barrier ring 181 rotates by 10° in the direction shown by an arrow X (one direction around the optical axis) by receiving the spring force of the opening spring 182. At this time, by the projection 181g1 of the barrier ring 181 pushing the projection 185e of the first barrier blade 185, the first barrier blade 185 rotates around the shaft 145q1 and stops in a position (an opening position) of moving out from the aperture portion 181h.

In addition, by the outer edge portion 185d of the first barrier blade 185 pushing the convexity 187d of the third barrier blade 187, the third barrier blade 187 also rotates around the shaft 145q1, and stops in a position of moving out from the aperture portion 181h.

Similarly to the first barrier blade 185 and third barrier blade 187, the second barrier blade 186 and fourth barrier blade 188 also rotate around the shaft 145q2 of the first lens barrel 145, and stops in a position of moving out from the aperture portion 181h. Namely, the projection 181g2 rotates the second barrier blade 186 in the direction of the opening position by pushing the projection 186e, and the outer edge portion 186d rotates the fourth barrier blade 188 in the direction of the opening position by pushing a convexity 185d.

In the above-described state, since the barrier blades 185 to 188 move out from the aperture portion 181h formed at the center of the barrier ring 181, the luminous flux of a subject can be incident into the lens barrel from this aperture portion 181h.

Next, a state of the barrier mechanism at the time when the lens barrel shifts from the image-taking state (telephoto state) to the lens-barrel collapse state (a state shown in FIG. 14) will be described.

When the power switch in the camera body 159 is turned off when the lens barrel is in the telephoto state shown in FIG. 19, the lens barrel starts retraction to an image face side by receiving the driving force of the motor 108.

Figure 20:
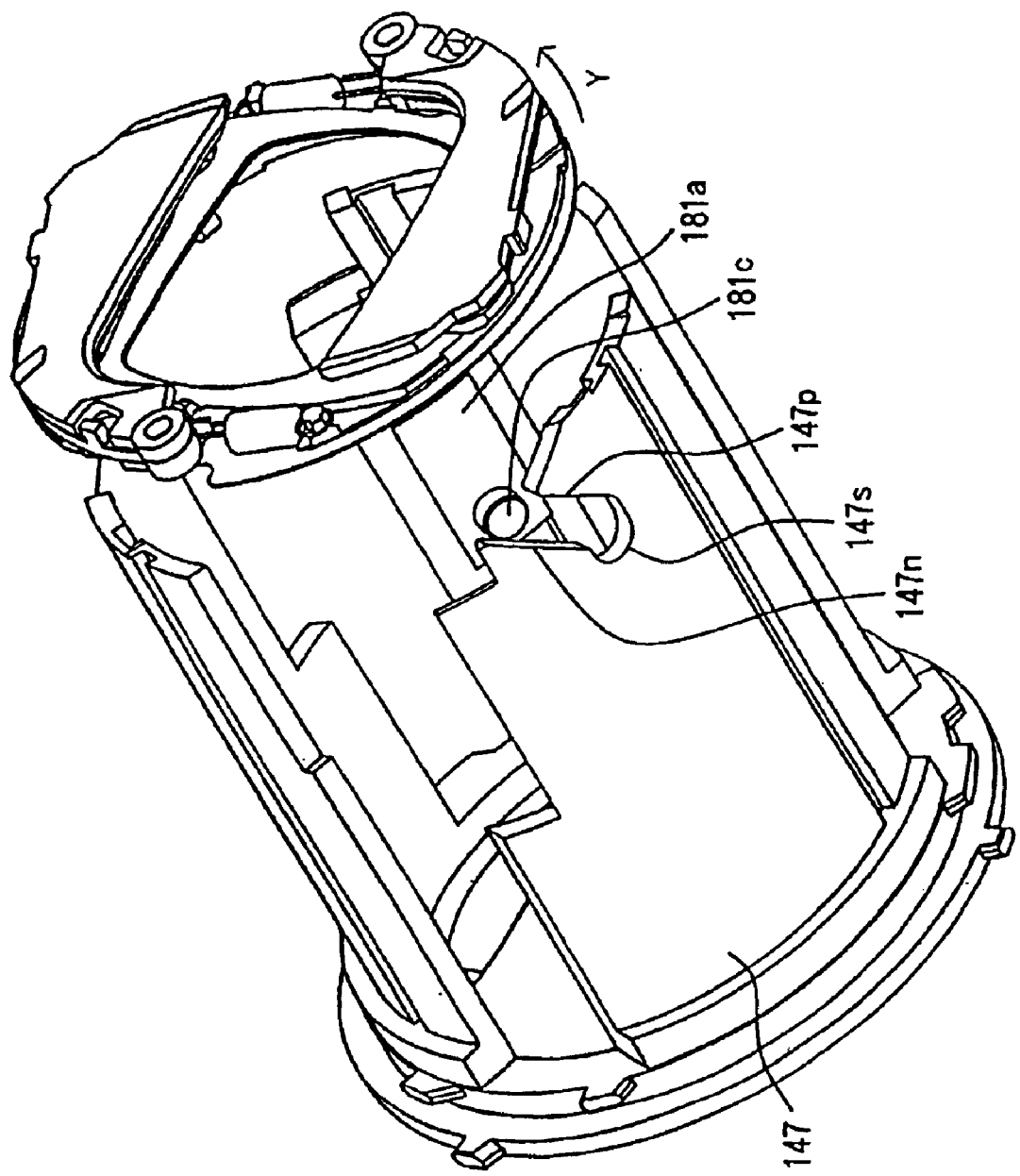
FIG. 20 is a partially structural perspective view of the barrier mechanism at being in an intermediate state between an image-taking state and the lens-barrel collapse state.

FIG. 20 is a perspective view showing the positional relation between the barrier mechanism and second rectilinear barrel 147 at the time when the lens barrel is on the way of being retracted. The state shown in this FIG. 20 is an intermediate state between the wide-angle state and lens-barrel collapse state.

In this drawing, the junction 181c makes contact with the first cam face 147n. When the lens barrel further retracts from this state to lessen the gap between the second rectilinear barrel 147 and barrier ring 181, the junction 181c of the barrier ring 181 moves along the first cam face 147n. At this time, the barrier ring 181 rotates in the direction shown by an arrow Y.

Figure 21:
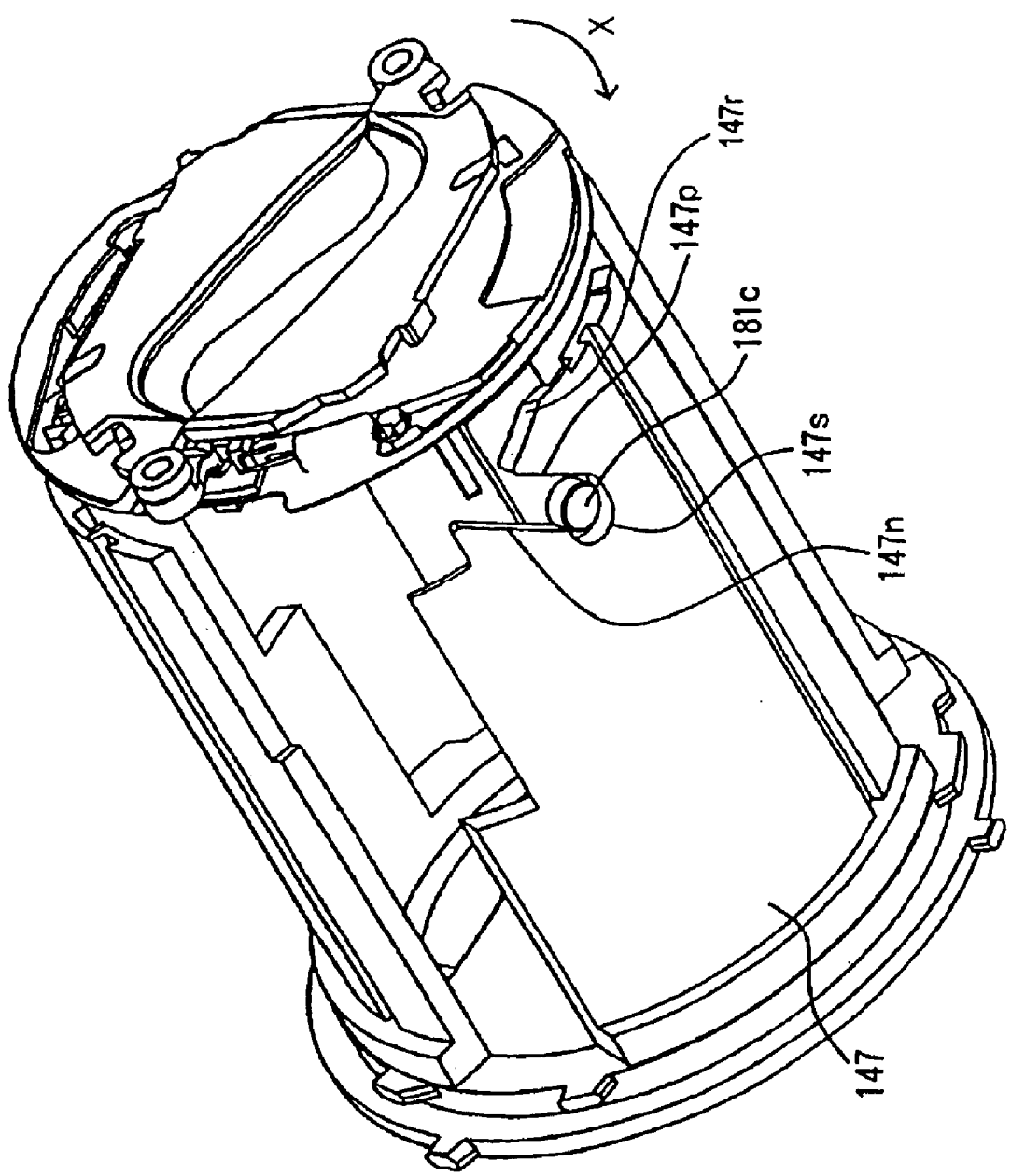
FIG. 21 is a partially structural perspective view of the barrier mechanism at being in the lens-barrier collapse state.

Then, when the junction 181c reaches the cam extension 147S, the lens barrel becomes a lens-barrel collapse state shown in FIG. 21.

When the barrier ring 181 rotates in the direction shown by the arrow Y, each of the projections 181g1 and 181g2 of the barrier ring 181 move in the direction apart from the projections 185e and 186e. When the projections 181g1 and 181g2 move in this manner, the barrier blades 185 and 186 receive the spring forces of the closing springs 183 and 184 to rotate in the direction (a closing direction) of covering the aperture portion 181h of the barrier ring 181.

Since pushing a concavity 187c of the third barrier blade 187 by the rotation of the first barrier blade 185 in the closing direction, a convexity 185c of the first barrier blade 185 rotates the third barrier blade 187 in the closing direction. In addition, since pushing a concavity 188c of the fourth barrier blade 188 by the rotation of the second barrier blade 186 in the closing direction, a convexity 186c of the second barrier blade 186 rotates the fourth barrier blade 188 in the closing direction.

Owing to the above-described operation, the barrier blades 185 to 186 advance in the aperture portion 181h of the barrier ring 181 to close the aperture portion 181h. In this manner, in regard to the operation of the barrier mechanism at the time when the lens barrel retracts from the image-taking state to the lens-barrel collapse state, as shown in FIGS. 19, 20, and 21, the barrier blades 185 to 188 close the aperture portion 181h of the barrier ring 181 by the junction 181c of the barrier ring 181 being guided by the first cam face 147n.

Here, since the junction 181c engages with the cam extension 147s when the lens barrel is in the lens-barrel collapse state, the barrier ring 181 is held in the predetermined rotational position, and hence, the barrier blades 185 to 188 keep closing the aperture portion 181h.

Next, a state of the barrier mechanism at the time when the lens barrel shifts from the lens-barrel collapse state to the image-taking state will be described.

As described above, the barrier ring 181 is energized by the spring force of the opening spring 182 in the direction where the barrier blades 185 to 188 open. As the lens barrel advances from the lens-barrel collapse state, shown in FIG. 21, to the telephoto state, the gap between the second rectilinear barrel 147 and barrier ring 181 in the direction of the optical axis becomes large. At this time, since receiving the energizing force by the opening spring 182, the junction 181c of the barrier ring 181 moves along the first cam face 147n.

Owing to this, the barrier ring 181 rotates in the direction (direction shown by an arrow X in FIG. 21) where the barrier blades 185 to 188 are opened. Then, when the lens barrel advances further, the barrier blades 185 to 188 move out from the aperture portion 181h of the barrier ring 181, and it becomes a state shown in FIG. 19.

Next, the operation of the barrier mechanism at the time when the lens barrel advances from the lens-barrel collapse state to the image-taking state in the case that an abnormal state occurs in the barrier mechanism will be described. Here, the abnormal state means such a state that the barrier ring 181 does not normally rotate because sand, dust, or the like adheres to the opening spring 182.

When the lens barrel advances from the lens-barrel collapse state to the image-taking state in an abnormal state such as shortage of the spring force of the opening spring 182, the junction 181c of the barrier ring 181 makes contact with the second cam face 147p in FIG. 21. Then, since the junction 181c moves along the second cam face 147p when the lens barrel advances further, the barrier ring 181 rotates in the direction shown by an arrow X, and hence, the barrier blades 185 to 188 in the closed state open gradually.

Furthermore, the junction 181c departs from the second cam face 147p in the vicinity of the boundary between the second cam face 147p and third cam face 147r. Owing to this, since the barrier ring 181 rotates to a predetermined rotational position (opening position), the barrier blades open normally.

Next, the operation of the barrier mechanism at the time when the lens barrel retracts from the image-taking state to the lens-barrel collapse state in the case that an abnormal state occurs in the barrier mechanism will be described.

Figure 22:
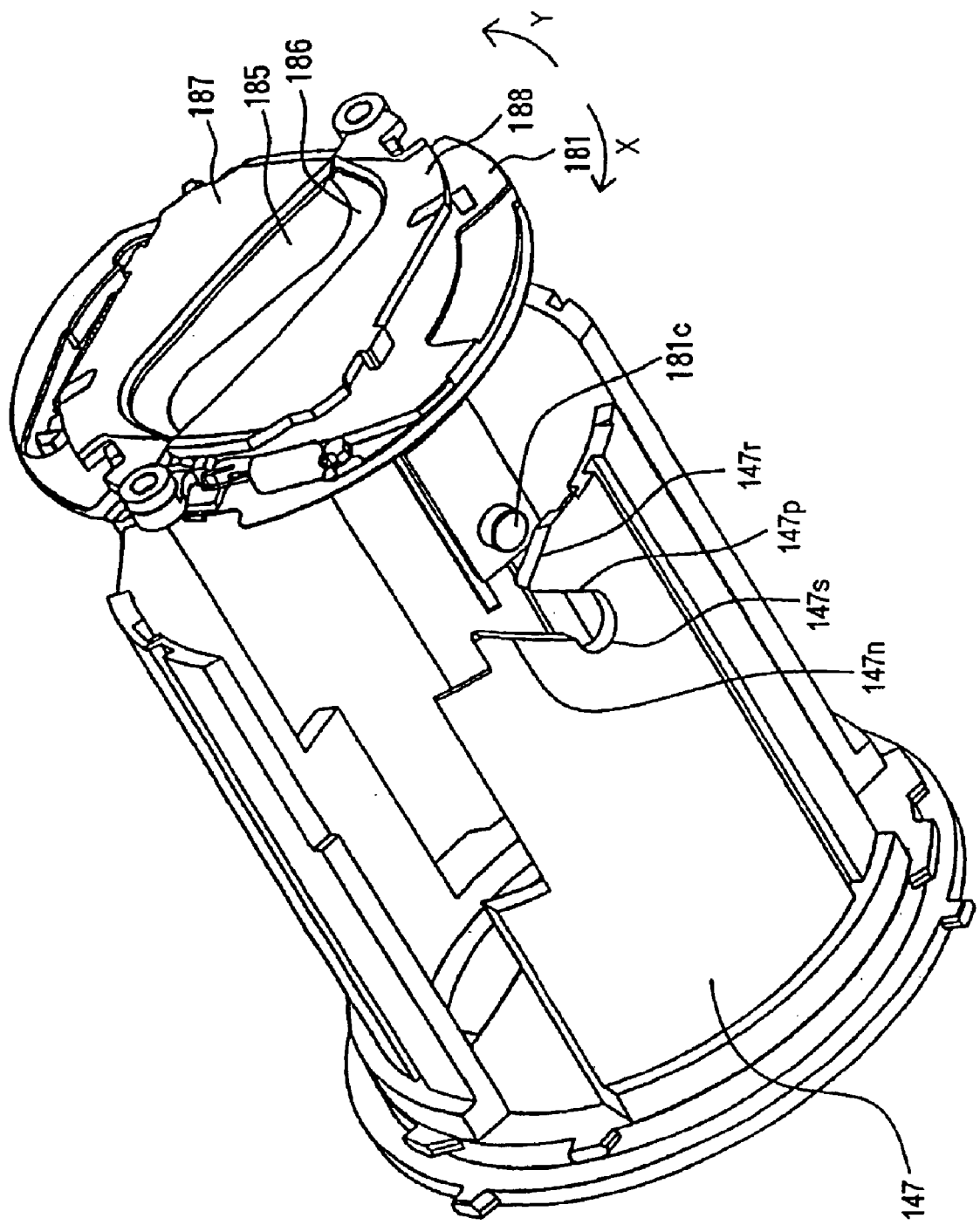
FIG. 22 is a partially structural perspective view of the barrier mechanism in an intermediate state between an image-taking state and the lens-barrel collapse state at the time when an abnormal state occurs.

When an abnormal state occurs in the barrier mechanism, for example, as shown in FIG. 22, the barrier ring 181 may be in a rotational position different from normal rotational positions (positions shown in FIGS. 19 and 20). Namely, the position of the junction 181c may be different from the positions shown in the normal state (FIGS. 19 and 20).

In the state shown in FIG. 22, when the lens barrel retracts from the image-taking state to the lens-barrel collapse state, a gap between the second rectilinear barrel 147 and barrier ring 181 in the direction of the optical axis becomes small. Owing to this, the junction 181c makes contact with the third cam face 147r and moves along the third cam face 147r as the gap between the second rectilinear barrel 147 and barrier ring 181 becomes small.

At this time, the barrier ring 181 rotates in the direction shown by an arrow X so that the barrier blades 185 to 188 open once. Then, when the lens barrel retracts further, the junction 181c departs from the third cam face 147r, makes contact with the first cam face 147n and moves along the first cam face 147n. Owing to this, the barrier ring 181 rotates in the direction shown by an arrow Y in FIG. 22 so that the barrier blades 185 to 188 close normally.

According to this embodiment, the barrier blades 185 to 188 are opened by compulsorily rotating the barrier ring 181 by this contacting action of the second cam face 147p, formed in the second rectilinear barrel 147, and the junction 181c. Owing to this, even if it is not possible to completely open the barrier blades 185 to 188 (in an abnormal state) by rotating the barrier ring 181 only by the spring force of the opening spring 182 because the opening spring 182 is damaged by an impact from the external of the lens barrel etc. or sand and dust adhere to the opening spring 182, it is possible to surely open the barrier blades 185 to 188 by rotating the barrier ring 181 by moving the junction 181c along the second cam face 147p.

In this manner, by surely opening the barrier blades 185 to 188, it is possible to prevent taking a picture without completely opening the barrier blades 185 to 188 when the lens barrel is in the image-taking state.

In addition, since it is made in this embodiment that the barrier blades 185 to 188 are compulsorily opened by using the second rectilinear barrel 147 that is an existing member in the lens barrel, it is not necessary to add a new member such as a detection switch like conventional technology.

Hence, it is possible to prevent the upsizing and cost increase of the lens barrel.

Furthermore, in this embodiment, even if the lens barrel is retracted from the image-taking state to the lens-barrel collapse state when the lens barrel is in the image-taking state and the barrier blades 185 to 188 are not completely opened (an abnormal state), it is possible to normally close the barrier blades 185 to 188 by guiding the junction 181c to the first cam face 147n by the third cam face 147r to move the junction 181c along the first cam face 147n.

Here, assuming that the third cam face 147r is a face orthogonal to the optical axis (an optical-axis orthogonal surface, that is, a face orthogonal to a moving direction of the junction 181c), the junction 181c in the abnormal state (FIG. 22) makes contact with this optical-axis orthogonal surface according to the retracting operation of the lens barrel. Hence it becomes not possible to normally close the barrier blades 185 to 188 since the retracting operation of the lens barrel is impeded.

Then, like this embodiment, by making the third cam face 147r be a shape of inclining to the above-described optical-axis orthogonal surface and guiding the junction 181c to the first cam face 147n, it becomes possible to secure the retracting operation of the lens barrel and to normally close the barrier blades 185 to 186.

In addition, in the above-described structure, since the barrier blades 185 to 188 in the closing state once open by the junction 181c moving along the third cam face 147r when the lens barrel retracts in the abnormal state, and thereafter, the junction 181c moves along the first cam face 147n, the barrier blades 185 to 188 close. In this manner, by closing the barrier blades 185 to 188 after once opening them, it is possible to shake off sand, dust, or the like that adheres to the opening spring 182, and it is also possible to restore the spring force of the opening spring 182.

(Embodiment 2)

A lens barrel that is Embodiment 2 of the present invention will be described. Though Embodiment 1 relates to an opening and closing mechanism of barrier blades, this embodiment relates to a driving mechanism of a correcting lens to correct aberration in an image pickup optical system.

Since the structure and operation of a lens barrel, and the circuit structure and operation of a camera in this embodiment are the same as those in Embodiment 1, explanation of them is omitted, but points different from Embodiment 1 will be explained in this embodiment. In addition, the same numeral references are used for the same members as the members described in Embodiment 1.

In FIG. 2 showing an exploded view of a lens barrel, and FIG. 5 showing a section of the lens barrel in the direction of an optical axis, a correcting lens (lens member) 401 is arranged in an image plane side of the first lens unit 160 (a right side in FIG. 5). This correcting lens 401 is fixedly bonded to a lens holder 402, and three driving pins 403 are provided on an outer circumferential surface of the lens holder 402.

This lens holder 402 is set the inside of a rear end of a shutter apparatus 101 (retaining member) and held.

Figure 23:
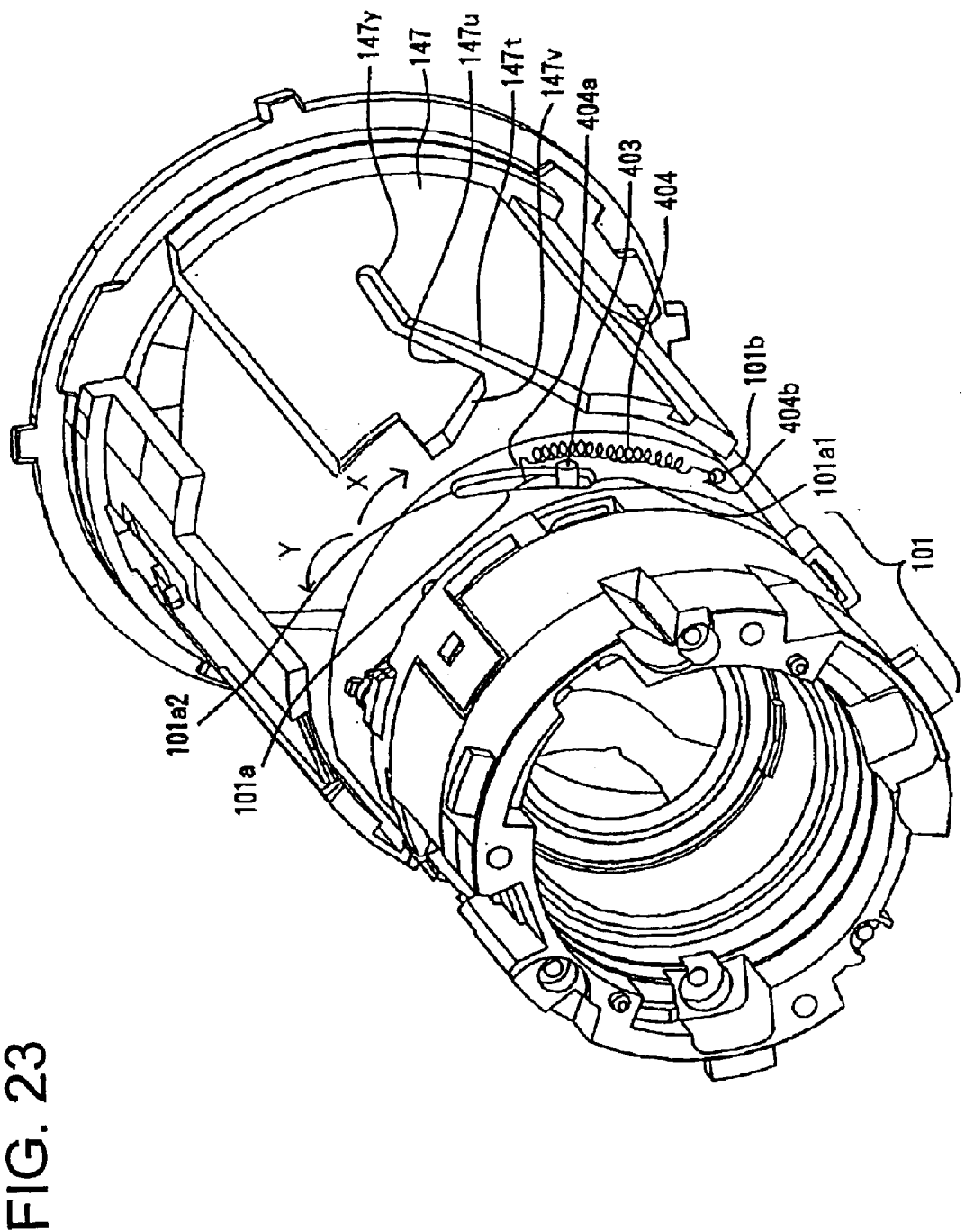
FIG. 23 is a partially structural perspective view of a lens barrel in a telephoto state in Embodiment 2.

The three driving pins 403 engage with three cam grooves 101a formed at the rear end of shutter apparatus 101 respectively (refer to FIG. 23). One driving pin 403 among the three driving pins 403 is formed longer than the two other driving pins 403, and protrudes to the outside of the shutter apparatus 101 with penetrating through the cam groove 101a of the shutter apparatus 101. Then, when the lens barrel shifts from the wide-angle state to the lens-barrel collapse state, this one driving pin 403 can make contact with lens cam faces 147t, 147u, and 147v described later.

As shown in FIG. 23, in regard to a moving spring (energizing member) 404, a hook portion 404a that is an end of this spring is fixed to a lens holder 402, and a hook portion 404b that is another end is hooked in a hole 101b for spring hooking that is formed in the shutter apparatus 101. Owing to the spring force of this moving spring 404, the lens holder 402 is energized in one direction around the optical axis (direction shown by X in FIG. 23), and the driving pin 403 makes contact with a part of the cam groove 110a (a telephoto end 110a1).

The operation of the lens holder 402 at the time when the lens barrel with the above-described structure shifts from the telephoto state to the wide-angle state and the lens-barrel collapse state will be described.

FIG. 23 shows a part of structure of the lens barrel in the telephoto state. In the state shown in FIG. 23, since the distance between the second rectilinear barrel 147 and shutter apparatus 101 in the direction of the optical axis is apart, the driving pin 403 makes contact with none of the lens cam faces 147t, 147u, and 147v formed in the second rectilinear barrel 147.

Therefore, the driving pin 403 of the lens holder 402 moves along the cam groove 110a by receiving the spring force of the moving spring 404, and stops in a position of the telephoto end 110a1. At this time, the lens holder 402 is in a predetermined telephoto position.

When the lens holder 402 (correcting lens 401) is in the telephoto position, a lens gap between the correcting lens 401 and first lens unit 160 is minimized, and hence, lens performance in the lens barrel is improved.

Since the gap between the second rectilinear barrel 147 and shutter apparatus 101 becomes small when the lens barrel in the telephoto state retracts in the wide-angle direction, the driving pin 403 of the lens holder 402 makes contact with the first lens cam face (a second guide portion) 147t. Then, when the lens barrel further retracts, the driving pin 403 moves in the cam groove 101a from the telephoto end 101a1 to the wide-angle end 101a2 with moving along the first lens cam face 147t.

Owing to this, the gap between the correcting lens 401 and first lens unit 160 in the direction of the optical axis becomes large, the correcting lens 401 moves to a position where the optical performance of the image pickup optical system becomes optimum when an image pickup lens (the first lens unit 160 and the second lens unit 152) is in the vicinity of the wide-angle side.

Figure 24:
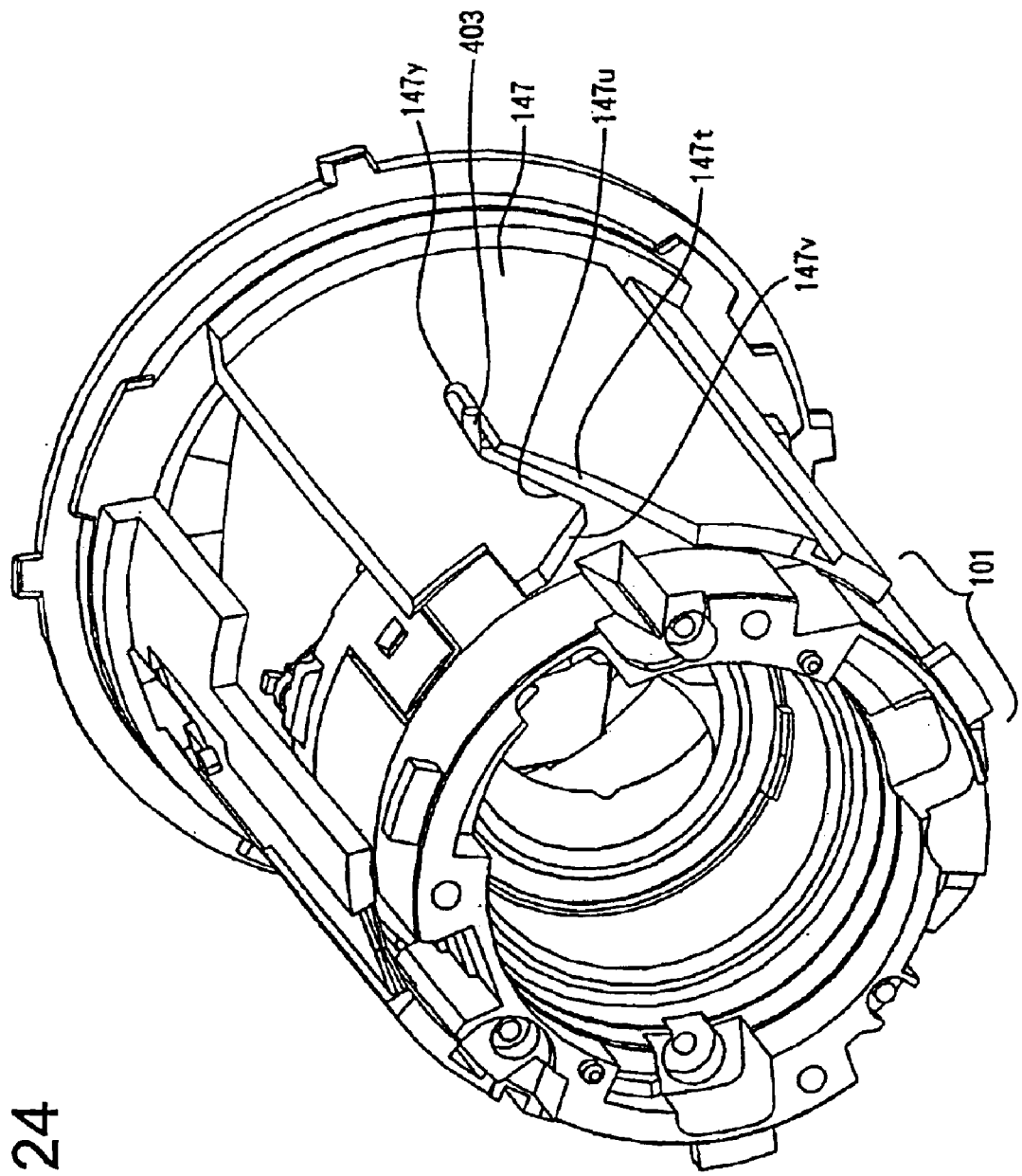
FIG. 24 is a partially structural perspective view of the lens barrel in a lens-barrel collapse state at the time when the abnormal state occurs.

FIG. 24 shows part of structure of the lens barrel in the lens-barrel collapse state. In the drawing, the driving pin 403 is located in the wide-angle end 101a2 in the cam groove 101a with engaging with a lens cam extension 147y extending in the direction of the optical axis.

On the other hand, when the lens barrel advances from the lens-barrel collapse state to the wide-angle state, the gap between the shutter apparatus 101 and second rectilinear barrel 147 in the direction of the optical axis becomes large. At this time, the driving pin 403 receiving the spring force of the moving spring 404 moves along the first lens cam face 147t. Owing to this, since the driving pin 403 moves to the telephoto end 101a1 from the wide-angle end 101a2 in the cam groove 101a, the gap between the correcting lens 401 and the first lens unit 160 in the direction of the optical axis is minimized.

Next, the operation of the lens holder 402 at the time when the lens barrel advances from the lens-barrel collapse state to the wide-angle state and telephoto state in the case that an abnormal state occurs in a driving mechanism of the lens holder 402 will be described. Here, the abnormal state means a state that the lens holder 402 cannot normally operate due to a cause such as an insufficient spring force of the moving spring 404.

In the case that the abnormal state occurs (the energizing force by the moving spring 404 is insufficient), when the lens barrel advances from the lens-barrel collapse state, shown in FIG. 24, to the image-taking state, the driving pin 403 makes contact with the second lens cam face (a first guide portion) 147u without contacting to the first lens cam face 147t since the driving pin 403 does not receive the sufficient energizing force by the moving spring 404. Then, the driving pin 403 moves along the second lens cam face 147u according to the advancing operation of the lens barrel. At this time, since the driving pin 403 moves to the telephoto end 101a1 from the wide-angle end 101a2 in the cam groove 101a, the gap between the correcting lens 401 and the first lens unit 160 becomes small.

Here, the second lens cam face 147u and first lens cam face 147t are formed to become approximately parallel mutually, and this gap is larger than a diameter of the driving pin 403 formed cylindrically. In addition, a gap of the lens cam extension 147y is also larger than the diameter of the driving pin 403.

Owing to this, the driving pin 403 moves along the second lens cam face 147u or first lens cam face 147t according to the advancing or retracting operation of the lens barrel without being blocked between the second lens cam face 147u and first lens cam face 147t, or in the lens cam extension 147y.

Figure 25:
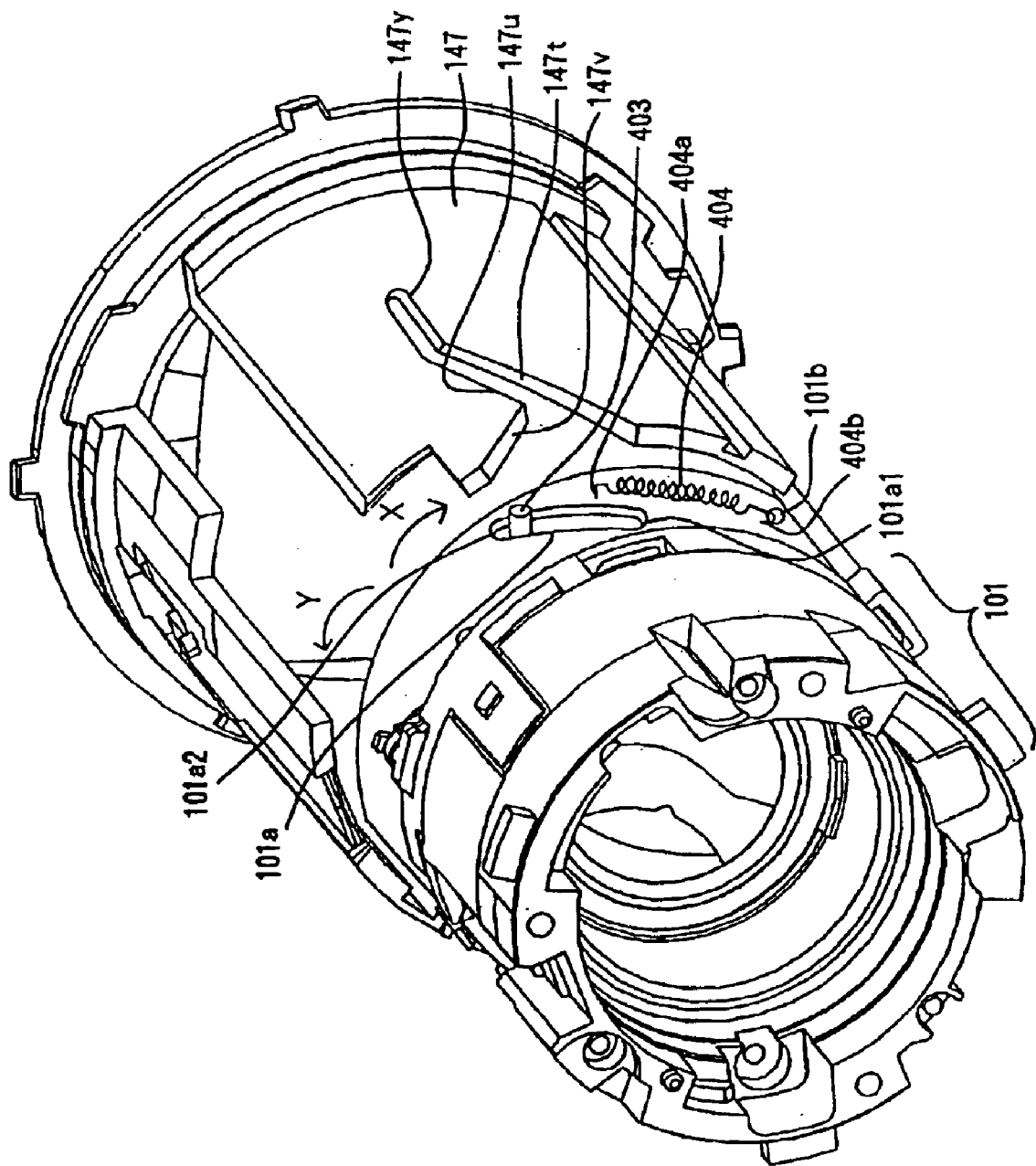
FIG. 25 is a partially structural perspective view of the lens barrel in a telephoto state.

FIG. 25 shows an abnormal state that the driving pin 403 is not located in the telephoto end 101a1 (position in the normal state), but in the wide-angle end 101a2 side when the lens barrel is in the telephoto state.

In the state shown in FIG. 25, since the gap between the shutter apparatus 101 and second rectilinear barrel 147 becomes small when the lens barrel retracts to the wide-angle side, the driving pin 403 makes contact with the third lens cam face 147v (a third guide portion) of the second rectilinear barrel 147. Then, when the lens barrel further retracts, the driving pin 403 moves to the telephoto end 101a1 side in the cam groove 101a with moving along the third lens cam face 147v.

When moving to an end of the third lens cam face 147v, the driving pin 403 departs from the third lens cam face 147v to makes contact with the first lens cam face 147t, and moves along this first lens cam face 147t. Owing to this, the driving pin 403 moves to the wide-angle end 101a2 in the cam groove 101a, and the correcting lens 401 returns to a normal position.

According to this embodiment, when the lens barrel in the above-described abnormal state advances from the lens-barrel collapse state to the image-taking state, the correcting lens 401 is moved by a proper amount in the direction of the optical axis by an engaging action between the driving pin 403 and cam groove 101a by compulsorily rotating the lens holder 402 because of moving the driving pin 403 according to the second lens cam face 147u of the second rectilinear barrel 147.

Owing to this, even if it is not possible to rotate the lens holder 402 because of an insufficient spring force of the moving spring 404 (in the case of the abnormal state), it is possible to surely move the correcting lens 401 in the direction of the optical axis by compulsorily rotating the lens holder 402. Hence, it is possible to secure the optical performance of the image pickup optical system.

In addition, in this embodiment, it is possible to stop the correcting lens 401 in a normal position by compulsorily rotating the lens holder 402 by using the second rectilinear barrel 147 that is an existing member in the lens barrel. Owing to this, it is possible to prevent the upsizing and cost increase of the lens barrel since it is not necessary to provide a detection switch, detecting a position of the correcting lens 401, and a mechanism, stopping the correcting lens in a normal position on the basis of the detection result of this detection switch.

Furthermore, in this embodiment, when the lens barrel retracts from the image-taking state to the lens-barrel collapse state in the case that the correcting lens 401 is not in the normal position (in the case of the abnormal state), the driving pin 403 is guided to the first lens cam face 147*t* by the third lens cam face 147*v* to move along the third lens cam face 147*t*. Hence, it is possible to return the correcting lens 401 to the normal position.

In addition, in the above-described structure, the lens holder 402 rotates in one direction around the optical axis (the direction shown by the arrow X) by moving the driving pin 403 along the third lens cam face 147*v*. Thereafter, by moving the driving pin 403 along the first lens cam face 147*t*, the lens holder 402 rotates in another direction around the optical axis (the direction shown by the arrow Y). In this manner, by rotating the lens holder 402 in another direction after once rotating it in one direction around the optical axis, it is possible to shake off dust, or the like that adheres, and it is also possible to restore the spring force of the moving spring 404.

(Embodiment 3)

Figure 26:
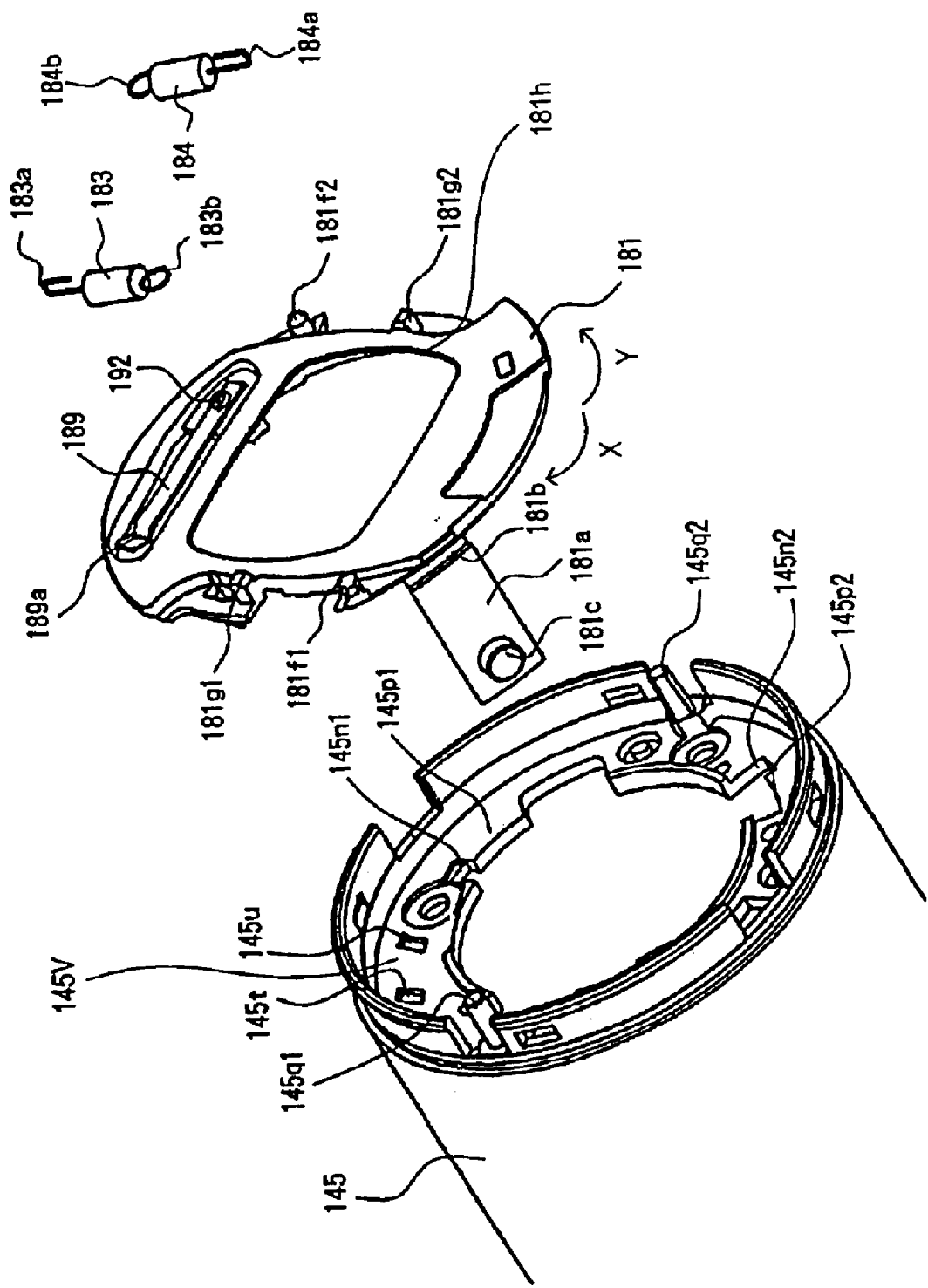
FIG. 26 is an exploded perspective view of a barrier mechanism in Embodiment 3.
Figure 27:
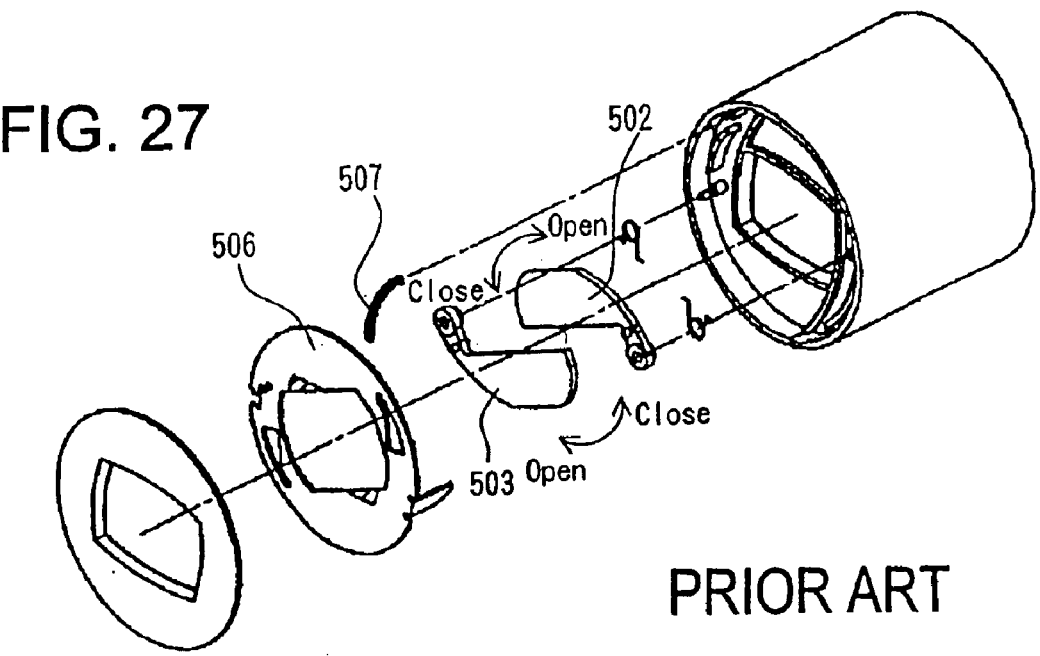
FIG. 27 is an exploded perspective view of a conventional lens barrel.
Figure 28:
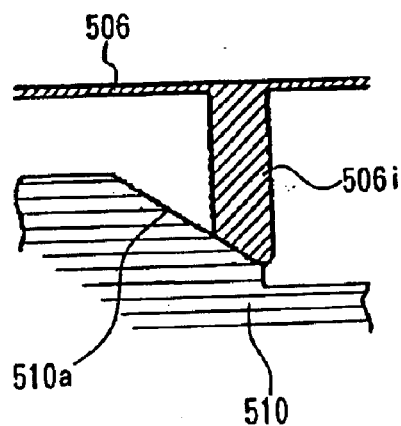
FIG. 28 is a sectional view showing a part of the conventional lens barrel.
Figure 29:
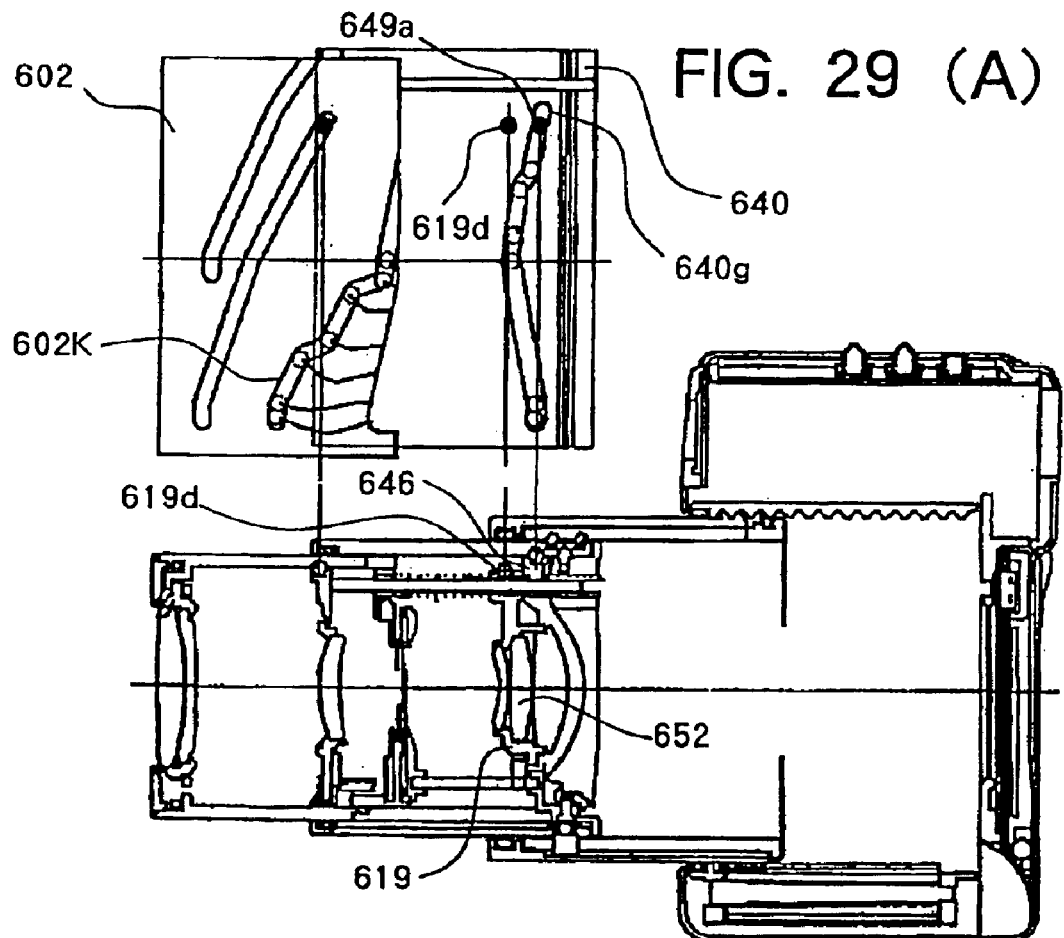
FIG. 29 is a sectional view of the conventional lens barrel.

A lens barrel that is Embodiment 3 of the present invention relates to an opening and closing mechanism of barrier blades similarly to that in Embodiment 1. Specifically, the lens barrel performs the opening and closing actions of the barrier blades by using a leaf spring 189 in place of the opening spring 182 in the barrier mechanism in Embodiment 1. In addition, the main structure and operation of the lens barrel, and the circuit structure and operation of a camera are similar to those in Embodiment 1. Furthermore, the same numeral references are used for the same members as the members described in Embodiment 1. Hereinafter, points different from those in Embodiment 1 will be described by using FIG. 26.

A leaf spring 189 is fixed to the barrier ring 181 with screws 192 in this base end portion. Two concavities 145*t* and 145*u* are provided in a front end face of the first lens barrel 145.

When the barrier blades 185 to 188 are closed, a convexity 189*a* formed in a front end of the leaf spring 189 enters the concavity 145*t* of the first lens barrel 145. When the barrier blades 185 to 188 are opened, a convexity 189*a* of the leaf spring 189 enters the concavity 145*u* of the first lens barrel 145.

When the barrier ring 181 rotates in the direction shown by the arrow X or the arrow Y between opening and closing positions, the convexity 189*a* of the leaf spring 189 impedes the rotating operation of the barrier ring 181 by sliding with a plane portion 145*v* that is located between two concavities 145*t* and 145*u* in the front end face of the first lens barrel 145.

Owing to this, since it is not easy for the barrier ring 181 to rotate between the opening position and closing position, it is possible to stably stop in the opening position and closing position. In addition, since the minute vibration of the barrier ring 181 is suppressed while the lens barrel is driven, not only the lens barrel smoothly moves between the wide-angle state and lens-barrel collapse state, but also the barrier ring 181 smoothly rotates. Hence, the opening and closing actions of the barrier blade becomes smooth.

The opening and closing actions of the barrier blades 185 to 188 in the lens barrel with the above-described structure will be described.

The convexity 189*a* of the leaf spring 189 enters the concavity 145*t* when the lens barrel is collapsed. When the lens barrel in the lens-barrel collapse state advances in the telephoto direction, the junction 181*c* in a cam extension 147*s* makes contact with the second cam face 147*p* since a gap between the barrier ring 181 and second rectilinear barrel 147 in the direction of the optical axis becomes large (refer to FIG. 19).

Then, when the gap between the barrier ring 181 and second rectilinear barrel 147 becomes larger, the junction 181*c* moves along the second cam face 147*p*, and hence, the barrier ring 181 rotates around the optical axis (direction shown by the arrow X).

At this time, the convexity 189*a* fit in the concavity 145*t* slips out from the concavity 145*t* to slide on the plane portion 145*v* of the first lens barrel 145.

When the junction 181*c* moves to an end of the second cam face 147*p*, the convexity 189*a* fits in the concavity 145*u*. Owing to this, the barrier ring 181 is held in the predetermined rotational position. At this time, the barrier blades 185 to 188 move out from the aperture portion 181*h* formed at the center of the barrier ring 181.

On the other hand, the gap between the barrier ring 181 and second rectilinear barrel 147 becomes small when the lens barrel in the image-taking state retracts in the lens-barrel collapse direction, and the junction 181*c* makes contact with the first cam face 147*n*. Then, when the gap between the barrier ring 181 and second rectilinear barrel 147 becomes smaller by the retracting operation of the lens barrel, the junction 181*c* moves along the first cam face 147*n*.

Owing to this, the barrier ring 181 rotates around the optical axis (in the direction shown by the arrow Y), and the convexity 189*a* fit in the concavity 145*u* slips out from the concavity 145*u* to slide on the plane portion 145*v* of the first lens barrel 145. Then, when the junction 181*c* moves to an end of the first cam face 147*n*, the convexity 189*a* fits in the concavity 145*t*.

Owing to this, the barrier ring 181 is held in the predetermined rotational position, and the aperture portion 181*h* of the barrier ring 181 covers the barrier blades 185 to 188.

Next, the opening and closing actions of the barrier blades 185 to 188 at the time when an abnormal state occurs in the barrier ring 181 will be described.

When the lens barrel in the lens-barrel collapse state advances in the wide-angle direction in the case that the barrier ring 181 does not normally rotate due to the abnormal state, the junction 181*c* makes contact with the second cam face 147*p* to move along this second cam face 147*p*. Owing to this, the barrier blades 185 to 188 become open.

In this manner, by moving the junction 181*c* along the second cam face 147*p*, it is possible to surely open the barrier blades 185 to 188.

On the other hand, when the lens barrel is in the image-taking state and an abnormal state occurs in the rotational operation of the barrier ring 181, the junction 181*c* may be located on a line extended in the direction of the optical axis to the third cam face 147*r* similarly to the case shown in FIG. 22.

Here, when the lens barrel retracts from the image-taking state in the lens-barrel collapse direction, the junction 181*c* makes contact with the third cam face 147*r* to move along this third cam face 147*r*. Then, when the lens barrel moves to an end of the third cam face 147*r*, the junction 181*c* makes contact with the first cam face 147n after departing from the third cam face 147r, and moves along the first cam face 147r thereafter. Owing to this, the barrier ring 181 rotates around the optical axis so that the barrier blades 185 to 188 close.

In this manner, even when the lens barrel is in the image-taking state and the abnormal state occurs in the rotational operation of the barrier ring 181, it is possible to surely close the barrier blades 185 to 188 by retracting the lens barrel.

In addition, though the opening and closing mechanism of the barrier ring 181 is described in this embodiment, it is also possible to apply this to the driving mechanism of the correcting lens in Embodiment 2. Namely, though the correcting lens 401 is energized in one direction around the optical axis by using the moving spring 404 in Embodiment 2, it is also good to impede the rotational operation of the correcting lens 401 by using the leaf spring according to this embodiment instead of the moving spring 404.

According to the present invention, for example, even when it becomes impossible to sufficiently rotate a driving member by an energizing force of an energizing member, it is possible to rotate the driving member in one direction around the optical axis by the first guide portion by rotating the driving member in the one direction around the optical axis by the energizing member or the first guide portion. In this manner, it is possible to surely drive the barrier member by surely rotating the driving member. For example, it is possible to avoid the inconvenience that the barrier member keeps closing a light-passing opening in spite of a state that the lens barrel is in the image-taking state.

In addition, it is not necessary to provide a detection switch, detecting an opening/closing state of the barrier member, by surely performing the opening and closing drive of the barrier member. Hence, it never arises that the lens barrel is upsized and increased in cost because of the increase of parts count.

Furthermore, according to the present invention, even when the driving member is not in the predetermined rotational position since an energizing member or a resistive member does not function enough, it is possible to rotate the driving member along a second guide portion by a third guide portion guiding the driving member to the second guide portion. Hence, it is possible that the driving member returns to a predetermined rotational position. Owing to this, it is possible to accurately perform the opening and closing drive of the barrier member.

What is claimed is:

1. A lens apparatus comprising:
   a lens unit which forms an optical image;
   a barrier member which can be moved open and close;
   a driving member that drives the barrier member into an open position by rotating in one direction around an optical axis, and drives the barrier member into a close position by rotating in another direction around the optical axis;
   an energizing member which energizes the driving member in the one direction; and
   a barrel which is constructed around the optical axis,
   wherein the driving member and the barrel move in the direction of the optical axis relatively; and
   wherein the barrel has a first guide portion that rotates the driving member in the one direction, and a second guide portion that rotates the driving member in the other direction while resisting an energizing force of the energizing member, according to a relative position change with the driving member; and
   wherein a length of the first guide portion in the direction of the optical axis is shorter than that of the second guide portion; and
   wherein the driving member drives the barrier member into the open position by rotating in the one direction by the first guide portion when the driving member can not rotate into a position corresponding to the open position of the barrier member by the energizing force of the energizing member.

2. The lens apparatus according to claim 1, wherein the barrel has a third guide portion that guides the driving member to the second guide portion according to the relative position change of the driving member.

3. A lens apparatus comprising:
   a lens unit which forms an optical image;
   a barrier member which can be moved open and close;
   a driving member that drives the barrier member into an open position by rotating in one direction around an optical axis, and drives the barrier member into a close position by rotating in another direction around the optical axis;
   a resistive member which impedes the rotation of the driving member; and
   a barrel which is constructed around the optical axis,
   wherein the driving member and the barrel move in the direction of the optical axis relatively; and
   wherein the barrel has a first guide portion that rotates the driving member in the one direction and a second guide portion that rotates the driving member in the other direction, according to a relative position change with the driving member; and
   wherein a length of the first guide portion in the direction of the optical axis is shorter than that of the second guide portion.

4. The lens apparatus according to claim 3, wherein the barrel has a third guide portion that guides the driving member to the second guide portion according to the relative position change with the driving member.

5. A lens apparatus comprising:
   a lens unit which forms an optical image;
   a lens holding member which holds the lens unit and can be moved in the direction of the optical axis;
   an energizing member which energizes the lens holding member in the one direction around the optical axis;
   a supporting member that has a cam portion that converts the rotation of the lens holding member around the optical axis into motion in the direction of the optical axis, and supports the lens holding member; and
   a barrel which is constructed around the optical axis,
   wherein the lens holding member and the barrel move in the direction of the optical axis relatively; and
   wherein the barrel has a first guide portion rotating the lens holding member in the one direction, and a second guide portion that rotates the lens holding member in the other direction around the optical axis, according to a relative position change with the supporting member; and
   wherein a length of the first guide portion in the direction of the optical axis is shorter than that of the second guide portion; and
   wherein the lens holding member rotates a predetermined amount in the one direction by the first guide portion and drives in the direction of the optical axis by the cam portion when the lens holding member can not rotate the predetermined amount in the one direction by an energizing force of the energizing member.

6. The lens apparatus according to claim 5, wherein the barrel has a third guide portion that guides the lens holding member to the second guide portion according to the relative position change with the supporting member.

7. A lens apparatus comprising:

a lens unit which forms an optical image;

a lens holding member which holds the lens unit;

a supporting member that has a cam portion that converts the rotation of the lens holding member around the optical axis into motion in the direction of the optical axis, and supports the lens holding member;

a resistive member which impedes the rotation of the lens holding member around the optical axis; and a barrel which is constructed around the optical axis, wherein the lens holding member and the barrel move in the direction of the optical axis relatively; and wherein the barrel has a first guide portion that rotates the lens holding member in one direction around the optical axis and a second guide portion that rotates the lens holding member in another direction around the optical axis, according to a relative position change with the supporting member; and wherein a length of the first guide portion in the direction of the optical axis is shorter than that of the second guide portion.

8. The lens apparatus according to claim 7, wherein the barrel further has a third guide portion that guides the lens holding member to the second guide portion according to the relative position change with the supporting member.

9. A camera comprising:

the lens apparatus according to claim 1; and an image pickup device which receives light passing through the lens apparatus and photoelectrically converts an image formed by the lens apparatus.

10. A camera comprising:

the lens apparatus according to claim 3; and an image pickup device which receives light passing through the lens apparatus and photoelectrically converts an image formed by the lens apparatus.

11. A lens apparatus comprising:

a lens unit which forms an optical image;

a barrier member which can be moved open and close;

a driving member that drives the barrier member into an open position by rotating in one direction around an optical axis, and drives the barrier member into a close position by rotating in another direction around the optical axis;

an energizing member which energizes the driving member in the one direction; and a barrel which is constructed around the optical axis and has a guide portion and a second guide portion, wherein the driving member and the barrel move in the direction of the optical axis relatively;

wherein the driving member makes contact with the second guide portion by receiving an energizing force of the energizing member with the relative movement of the driving member and the barrel; and wherein the first guide portion is formed along the second guide portion and a length of the first guide portion in the direction of the optical axis is shorter than that of the second guide portion.

12. A camera comprising:

the lens apparatus according to claim 11; and an image pickup device which receives light passing through the lens apparatus and photoelectrically converts an image formed by the lens apparatus.

* * * * *

UNITED STATES PATENT AND TRADEMARK OFFICE
CERTIFICATE OF CORRECTION

PATENT NO. : 6,851,871 B2
DATED : February 8, 2005
INVENTOR(S) : Shinichi Masuda It is certified that error appears in the above-identified patent and that said Letters Patent is hereby corrected as shown below:

Column 6,
Line 39, insert the following paragraph:
-- Here, a spring 153 engages an angular hole 148b in the second lens holder 148, and urges cam pin 148a outward in radial direction with respect to the second lens holder 148. This eliminates play between the third cam grooves 144c and cam pin 148a. --.

Column 8,
Line 29, delete "39" and insert -- 49 --.
Line 66, after "result" insert -- into one of the numbers 0 to 50 as shown in Table 1, and --.

Column 9,
Line 61, delete "them motor 108" and insert -- the motor 108 --.

Column 13,
Line 35, delete "pushed do to" and insert -- pushed down to --.

Column 19,
Lines 9-10, delete "grove 110α (a telephoto end 110α1)." and insert -- grove 101α (a telephoto end 101α1). --.
Line 23, delete "groove 110α" and insert -- groove 101α --.
Line 25, delete "end 110α1" and insert -- end 101α1 --.

Signed and Sealed this

Sixth Day of June, 2006

JON W. DUDAS
*Director of the United States Patent and Trademark Office*